Aug. 28, 1962     O. J. M. SMITH     3,051,883
DEAD BEAT RESPONSE, RESONANT LOAD, CONTROL SYSTEM AND METHOD
Filed March 15, 1957     9 Sheets-Sheet 1
FIG_1A_
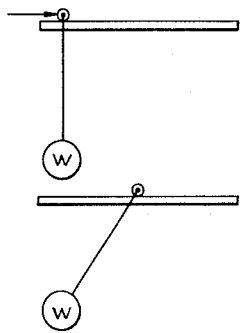
FIG_1E_
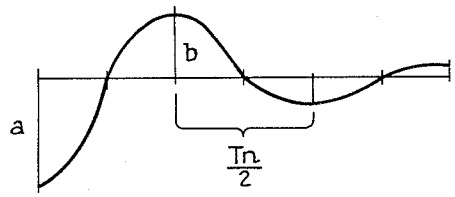
FIG_1B_
FIG_1C_
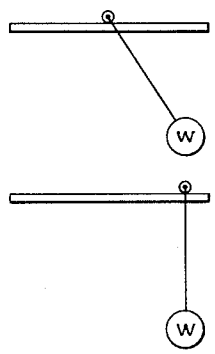
FIG_1D_
FIG_2A_     FIG_2C_
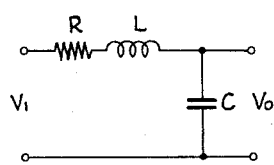
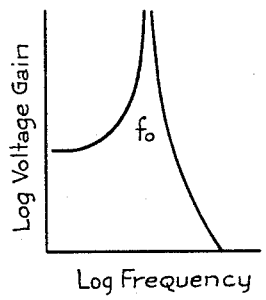
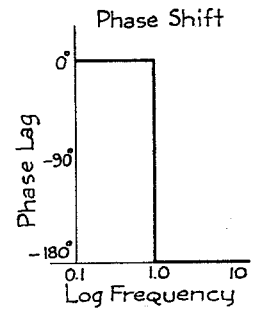
FIG_2B_
FIG_2D_
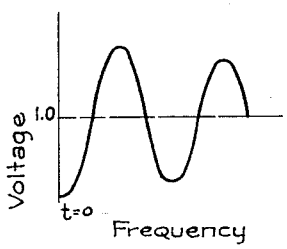
INVENTOR.
Otto J. M. Smith
BY
ATTORNEYS Aug. 28, 1962
O. J. M. SMITH
3,051,883
DEAD BEAT RESPONSE, RESONANT LOAD, CONTROL SYSTEM AND METHOD
Filed March 15, 1957
9 Sheets-Sheet 2
FIG_3A  B  C
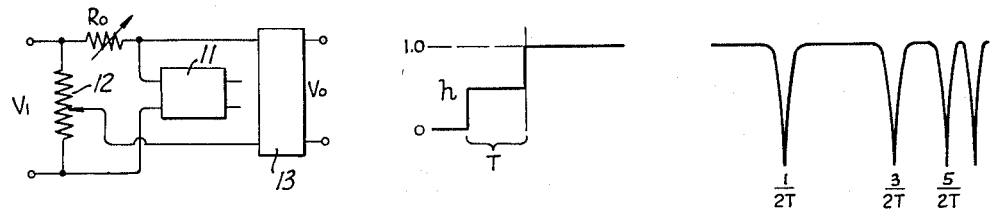
FIG_4A  B  C
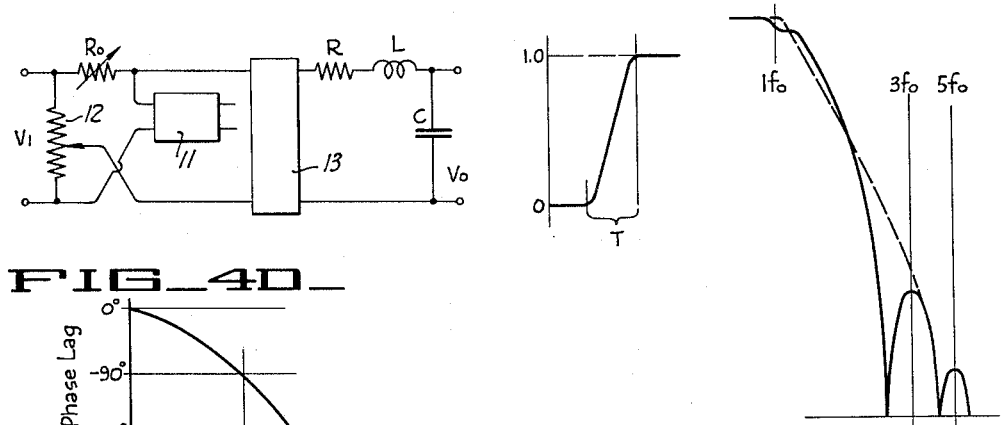
FIG_4D
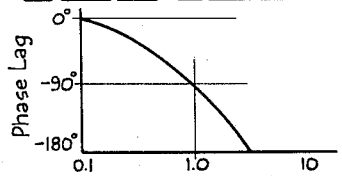
FIG_5A  B  C
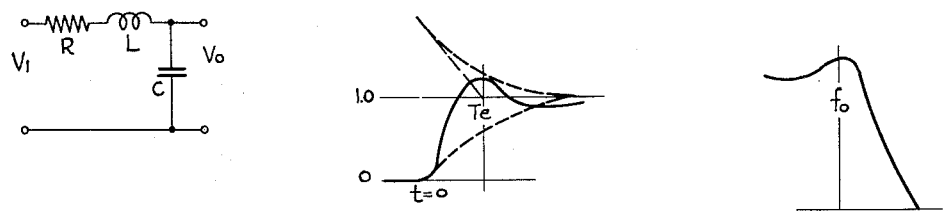
FIG_6A  B  C
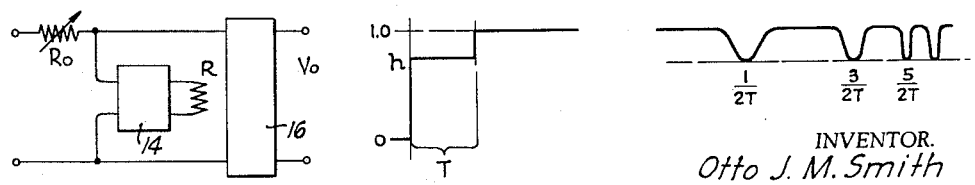
INVENTOR.
Otto J. M. Smith
BY
ATTORNEYS Aug. 28, 1962     O. J. M. SMITH     3,051,883
DEAD BEAT RESPONSE, RESONANT LOAD, CONTROL SYSTEM AND METHOD
Filed March 15, 1957     9 Sheets-Sheet 3
FIG_7A_____B_____C_
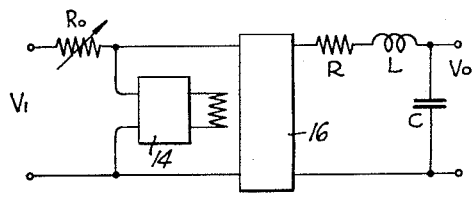
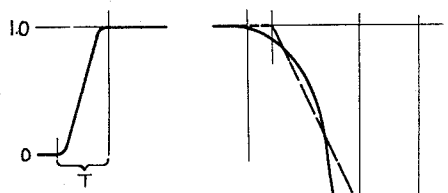
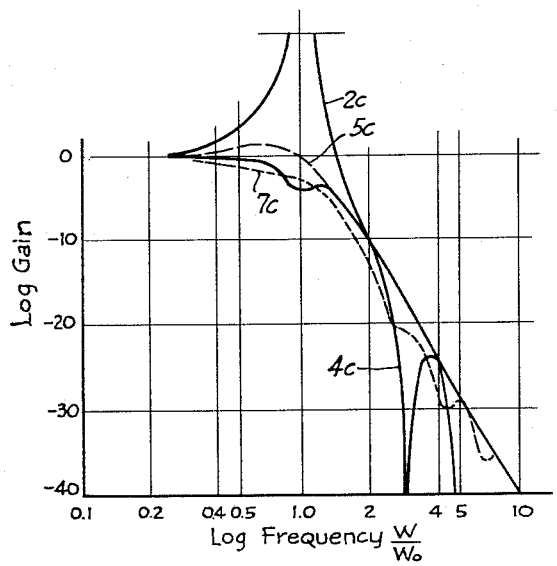
FIG_8_
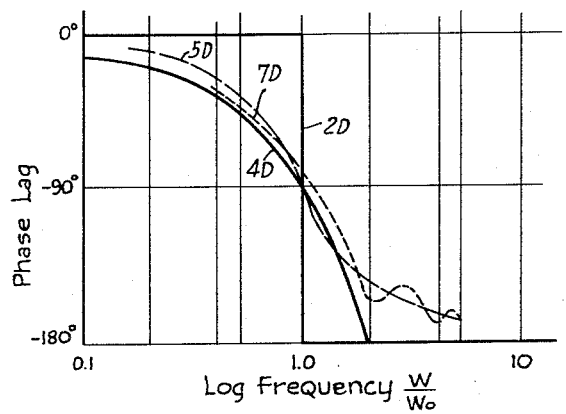
FIG_9_
INVENTOR.
Otto J. M. Smith
BY
ATTORNEYS Aug. 28, 1962  O. J. M. SMITH  3,051,883
DEAD BEAT RESPONSE, RESONANT LOAD, CONTROL SYSTEM AND METHOD
Filed March 15, 1957  9 Sheets-Sheet 4
FIG_10A_
FIG_10B_
FIG_10C_
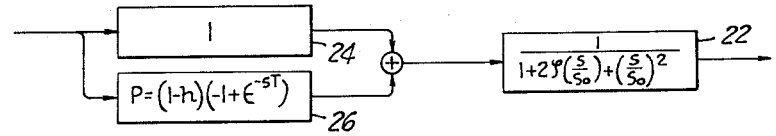
FIG_11_
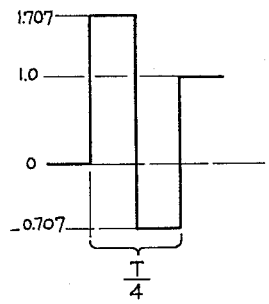
FIG_12_
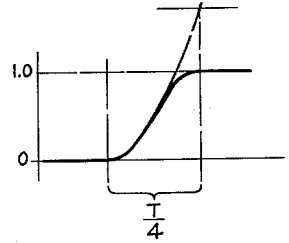
FIG_13_
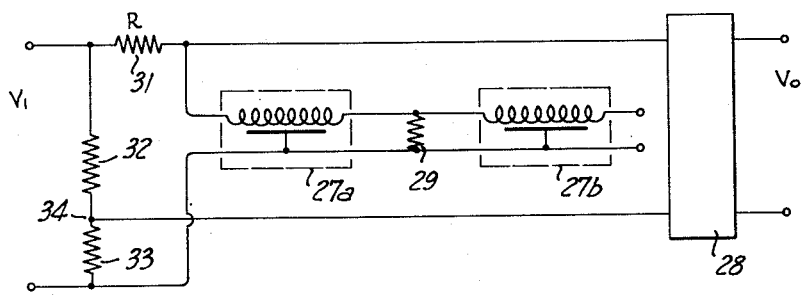
INVENTOR.
Otto J. M. Smith
BY
ATTORNEYS Aug. 28, 1962   O. J. M. SMITH   3,051,883
DEAD BEAT RESPONSE, RESONANT LOAD, CONTROL SYSTEM AND METHOD
Filed March 15, 1957   9 Sheets-Sheet 5
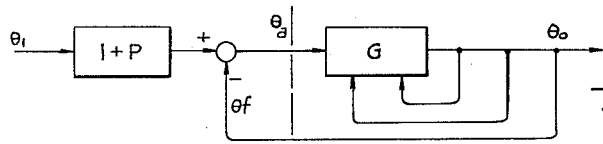
FIG_14A_
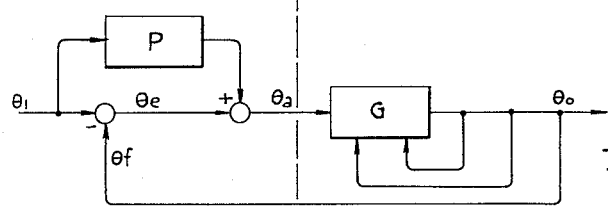
FIG_14B_
FIG_15_
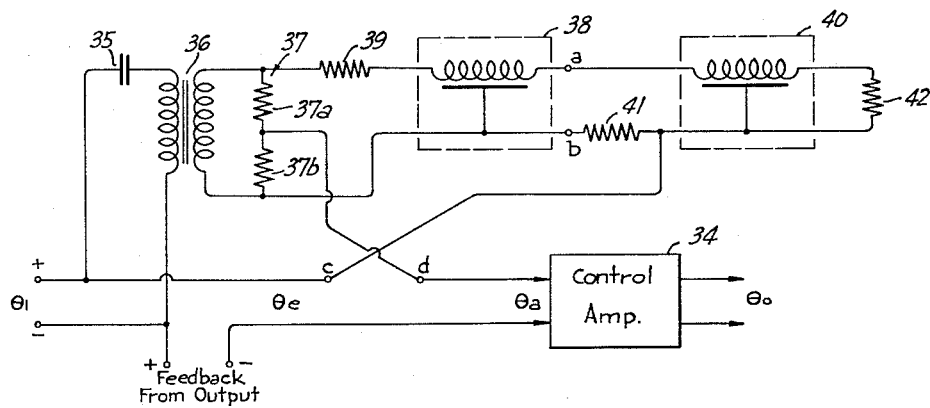
FIG_16_
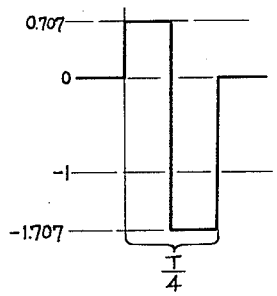
INVENTOR.
Otto J. M. Smith
BY
ATTORNEYS Aug. 28, 1962　　O. J. M. SMITH　　3,051,883
DEAD BEAT RESPONSE, RESONANT LOAD, CONTROL SYSTEM AND METHOD
Filed March 15, 1957　　9 Sheets-Sheet 6
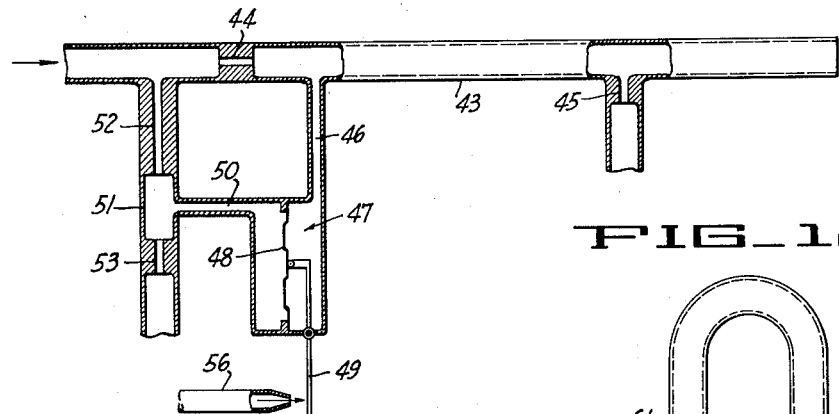
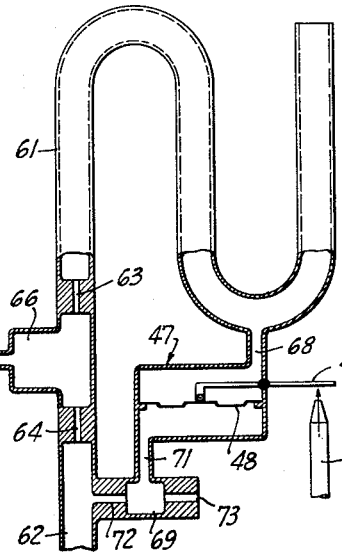
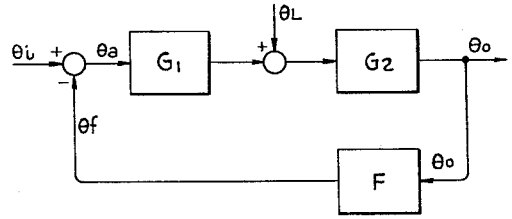
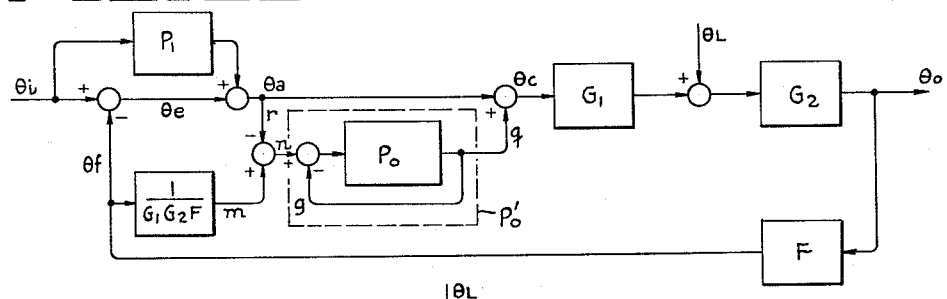
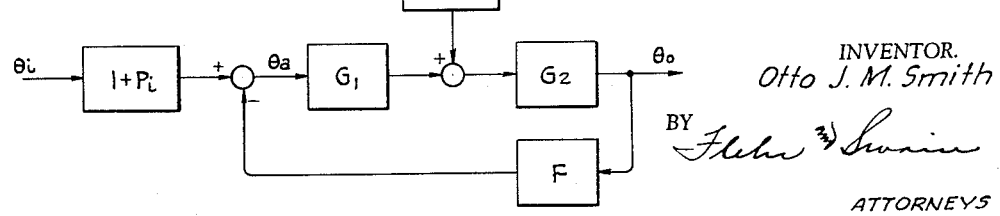
INVENTOR.
Otto J. M. Smith
BY
ATTORNEYS

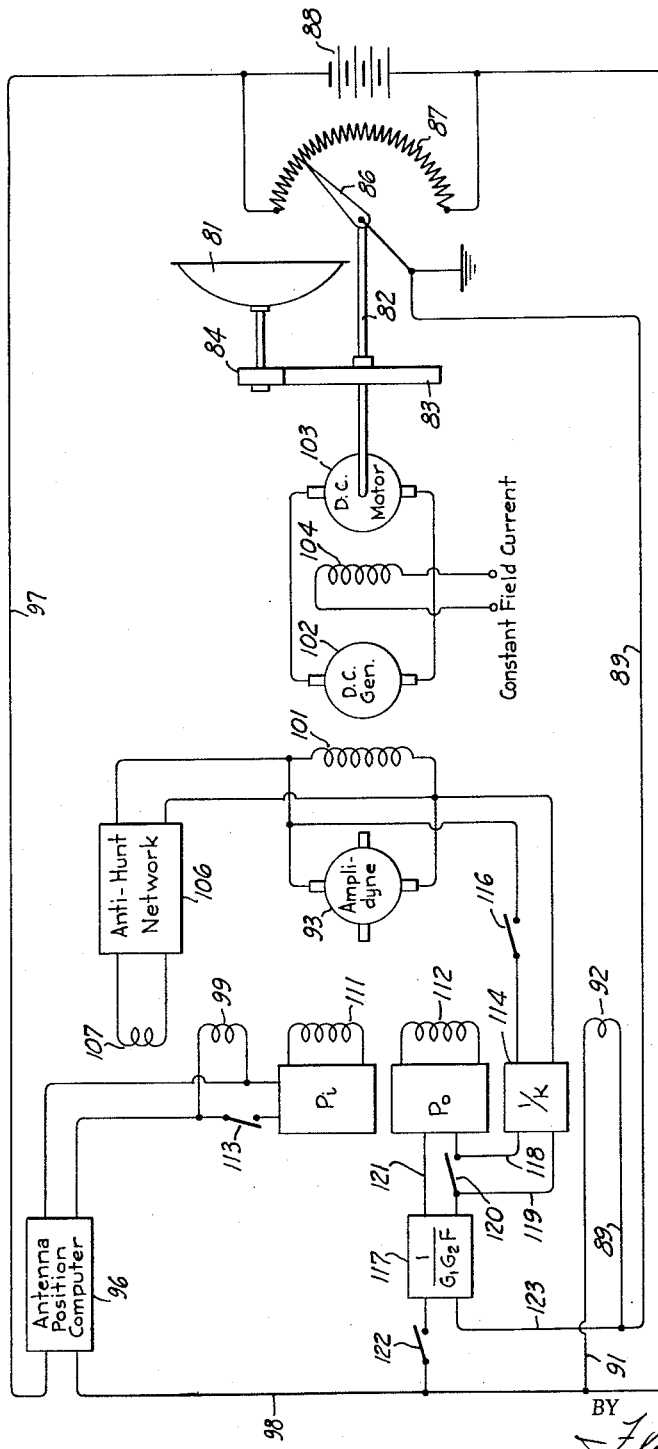

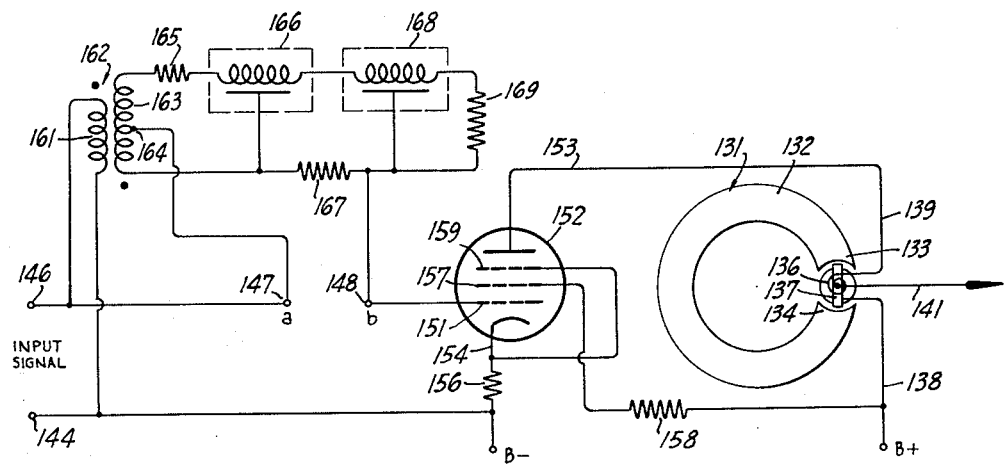
FIG_23_
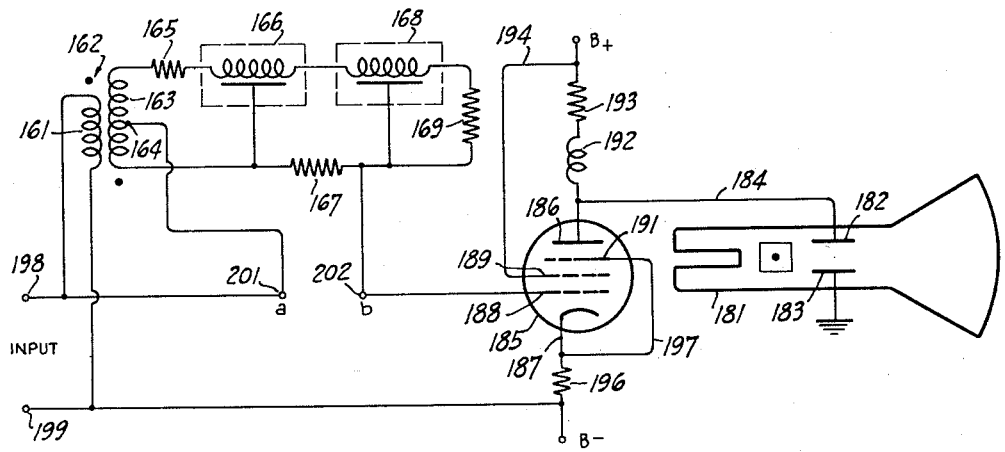
FIG_24_

Aug. 28, 1962  O. J. M. SMITH  3,051,883
DEAD BEAT RESPONSE, RESONANT LOAD, CONTROL SYSTEM AND METHOD
Filed March 15, 1957  9 Sheets-Sheet 9
FIG_25_
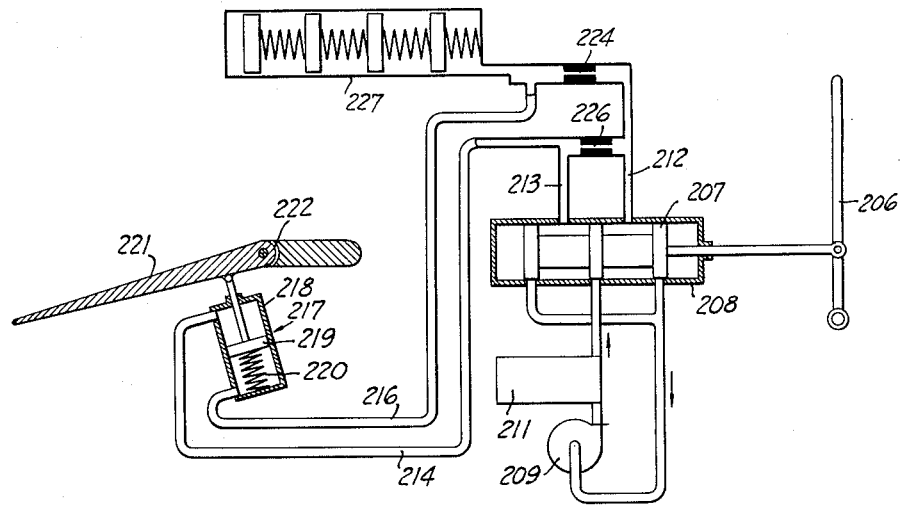
FIG_26_
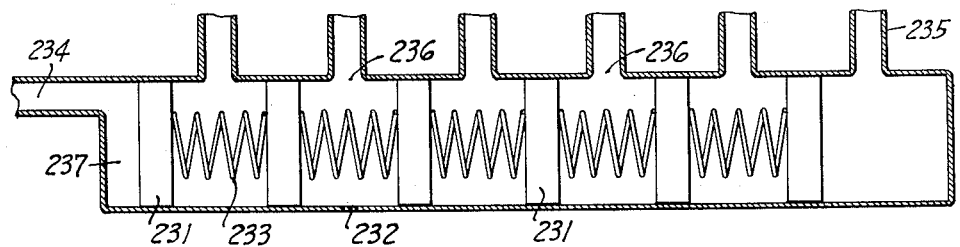
FIG_27_
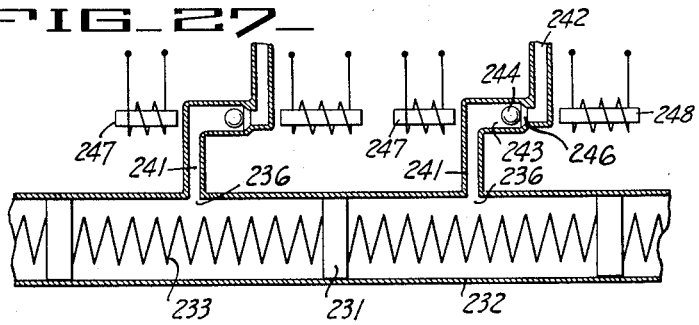
INVENTOR.
Otto J. M. Smith
BY
ATTORNEYS United States Patent Office 3,051,883
Patented Aug. 28, 1962

3,051,883
DEAD BEAT RESPONSE, RESONANT LOAD,
CONTROL SYSTEM AND METHOD
Otto J. M. Smith, Contra Costa County, Calif.
(612 Euclid Ave., Berkeley 8, Calif.)
Filed Mar. 15, 1957, Ser. No. 646,412
30 Claims. (Cl. 318—448)

This invention relates generally to a control system and method and more particularly to a control system and method for use with damped resonant systems.

Heretofore, little if any work has been done on lightly damped resonant systems. Prior work in the field has involved the use of root-locus methods on closed loop feed-back systems with primary consideration given to lumped parameter networks and little, if any consideration to the use of tapped transmission lines or distributed parameter type devices in the design of phase lead devices.

In general, it is an object of the present invention to provide a control system and method adapted for use with damped resonant systems in which the response to a step transient is non-oscillatory or, in other words, dead-beat.

Another object of the invention is to provide a system and method of the above character in which no resonant peak occurs in the frequency response.

Another object of the invention is to provide a system and method of the above character which makes possible the use of a highly oscillatory feed-back system in which sudden changes in the input or in the load do not excite oscillation.

Another object of the invention is to provide a system of the above character which is minimum phase.

Another object of the invention is to provide a system and method of the above character which is particularly applicable to lightly damped oscillatory systems in which it is difficult or undesirable to include damping.

Another object of the invention is to provide a control system and method of the above character in which step response transient times can be made a small fraction of the natural transient period.

Another object of the invention is to provide a control system and method of the above character in which the wave-shape reproduction is superior to linear lumped parameter type compensation or stabilization.

Another object of the invention is to provide a system and method of the above character which can be applied to any type of system whether mechanical, hydraulic, pneumatic or electrical.

Another object of the invention is to provide a system and method of the above character in which half cycle control is obtained by separating the input transient into two driving functions.

Another object of the invention is to provide a system and method of the above character in which faster than half cycle control is obtained by separating the input transients into three or more driving functions.

Additional objects and features of the invention will appear from the following description in which the preferred embodiment has been set forth in detail in conjunction with the accompanying drawing.

Referring to the drawing:
FIGURES 1A, 1B, 1C and 1D are schematic diagrams of an undamped pendulum;
FIGURE 1E shows the form of the transient or step response of the pendulum alone caused by single step function;
FIGURE 2A shows a simple electrical circuit having the characteristics of the pendulum in FIGURE 1A;
FIGURE 2B is the normalized step response for the circuit in FIGURE 2A;
FIGURE 2C is the frequency response curve for the circuit shown in FIGURE 2A;
FIGURE 2D is the phase shift curve for the circuit shown in FIGURE 2A;
FIGURE 3A is a schematic diagram of an equalizing or compensating section utilizing an open circuit reflecting transmission line;
FIGURES 3B and 3C are the normalized step response curves and frequency response curve for the network shown in FIGURE 3A;
FIGURE 4A shows the resonant load circuit of FIGURE 2A connected to the compensating network of FIGURE 3A by an isolating amplifier;
FIGURES 4B and 4C are the step response and frequency response curves for the circuit shown in FIGURE 4A and FIG. 4D is the phase response curve for the same circuit;
FIGURE 5A shows a resonant load circuit similar to FIGURE 2A but with more damping;
FIGURES 5B, 5C and 5D show the step response and frequency response curves for the circuit in FIGURE 5A;
FIGURE 6A is a schematic diagram of the required compensating section for FIGURE 5A;
FIGURES 6B and 6C show the step response and frequency response curves for the section;
FIGURE 7A shows a schematic diagram of the compensating network of FIGURE 6A connected to the resonant load of FIGURE 5A;
FIGURES 7B, 7C and 7D show the step response and frequency response curves for the combined network shown in FIGURE 7A;
FIGURE 8 shows a group of frequency response curves;
FIGURE 9 shows a group of phase lag curves;
FIGURES 10A, 10B and 10C are systems shown in block diagrams;
FIGURE 11 is a curve showing control commands for one-quarter cycle response;
FIGURE 12 is a curve showing the step response of a circuit when the transient reaches its final steady state value in one-fourth cycle;
FIGURE 13 is a schematic diagram of a compensating section which can be used to achieve one-quarter cycle response;
FIGURES 14A and 14B are block diagrams of feedback systems utilizing my control;
FIGURE 15 is a circuit diagram of a P block;
FIGURE 16 shows theh step response output from the circuit in FIGURE 15;
FIGURE 17 is a schematic diagram of a pneumatic system which is an analogue of the electrical system in FIGURE 13;
FIGURE 18 is a schematic diagram which is an analogue of the electrical system in FIGURE 15;
FIGURE 19 is a block diagram of a simplified feedback system with load disturbances;
FIGURE 20 is a block diagram of a feedback system which includes compensation for input transients and load disturbance transients;
FIGURE 21 is a block diagram derived from the block diagram of FIGURE 20;
FIGURE 22 is a schematic diagram of an electro-mechanical form of control;
FIGURE 23 is a schematic diagram of a direct recording ammeter embodying my invention;
FIGURE 24 is a schematic diagram of an oscilloscope embodying my invention;
FIGURE 25 is a schematic diagram of a hydraulic pitch control apparatus embodying my invention;
FIGURE 26 is a detailed schematic view of a hydraulic transmission line; and FIGURE 27 is a detailed schematic view of another embodiment of a hydraulic transmission line.

My method for making a lightly damped resonant system dead-beat, that is, to make its response to step transients non-oscillatory, can be best demonstrated by the problem posed of changing the at-rest position of an undamped pendulum. A pendulum at an at-rest condition is shown in FIGURE 1A. Normally, when it is desired to shift the position of the pendulum, the point of suspension is moved to the new position. However, upon such movement of the point of suspension of the pendulum, the pendulum will swing widely and will not come to rest for an appreciable length of time. Utilizing my method of control, the point of suspension is suddenly moved from the at-rest position in FIGURE 1A one-half the distance to the desired final position. FIGURE 1B shows the pendulum immediately after this input step. The pendulum is then allowed to swing to its maximum (a zero-velocity point) which is after one-half cycle of the natural transient as shown in FIGURE 1C. The point of suspension is then suddenly moved directly over the pendulum as shown in FIGURE 1D. This may be termed a delayed half-step. The pendulum will remain stationary at this new position.

FIGURE 1E is the step response curve for the pendulum. With my control as hereinbefore described, an input step of magnitude $a+b$ is divided into an initial step $a$ and a delayed step $b$ at time $T_n/2$ where $T_n$ is the transient period of one cycle of oscillation.

It is apparent that by this method the pendulum is moved from one steady state position to another steady state position quickly and with no overshoot. In the above system it has been assumed that the system is unilateral, that is, the force moving the point of suspension of the pendulum is of sufficient strength that it can move the position of the point of suspension without reference to the forces exerted on the point of suspension by the pendulum. In other words, the movement of the point of suspension is independent of the forces against which it must act.

The pendulum is a lightly damped resonant system because the only losses are friction and windage losses due to motion of the pendulum in the air.

FIGURE 2A shows an electrical circuit which has the same characteristics as the pendulum shown in FIGURE 1A. It is an RLC circuit in which the magnitude of the resistance is quite low so that the voltages impressed across the series combination of the inductance and capacitance will produce a voltage across the capacitor alone. If one were to put a step function across the terminals labeled $V_i$, the output voltage $V_o$, which is the voltage across the capacitor C will oscillate about its final steady state value to produce a curve like that shown in FIGURE 2B. The curve shows the normalized step response for unit step input.

If one measures the output voltage as a function of an input sine wave under steady state conditions, one obtains the ratio of the output to the input voltage. This ratio is called the frequency response and is shown in FIGURE 2C. At low frequencies the frequency repsonse is unity and as the resonant frequency is approached, the output voltage rises to a high value and then suddenly attenuates markedly above the resonant frequency.

The phase shift is shown in FIGURE 2D and shows a phase lag of substantially zero degrees up to the resonant frequency and then suddenly at the resonant frequency the phase lag jumps through $-90°$ to $-180°$ and is relatively constant at the $180°$ value for frequencies above the resonant frequency.

The Laplace transform of the transfer function of the circuit shown in FIGURE 2A is as follows:

$$\frac{V_o}{V_i}=\frac{1}{1+2\zeta\left(\frac{s}{\omega_0}\right)+\left(\frac{s}{\omega_0}\right)^2}$$

$\omega_0$ represents the undamped resonant frequency which is the frequency at which the steady state sinusoidal phase lag is minus $90°$. Zeta is a measure of the damping.

$$\zeta=\frac{\alpha}{\omega_0}=\left(\frac{R}{2L}\right)\sqrt{LC}=\frac{R}{2}\sqrt{\frac{C}{L}}$$

where $$\alpha=\frac{R}{2L}$$

$s$=complex variable of the Laplace transformation,

FIGURE 3A is a schematic diagram of the compensating network to be used ahead of the circuit shown in FIGURE 2A to reduce the resonances in the circuit in FIGURE 2A to an insignificant amount. The compensating network consists of a reflecting distortionless open-circuit transmission line 11 which is connected to the input terminals of the network through a variable resistance $R_0$. A potentiometer 12 is connected across the input terminals and the center tap of the potentiometer is connected to an isolating amplifier 13 which has a gain of $2h$. The amplifier is merely a device to deliver an output voltage which is a function only of the input voltage and independent of load conditions. The amplifier is also connected to the resistance $R_0$. The output of the amplifier is connected to the terminals of the network. The potentiometer 12 is used for compensating for line losses.

Operation of the network shown in FIGURE 3A is as follows: A step function of input voltage $V_i$ will divide into two parts, one-half appearing across the input impedance of the transmission line 11 which is the characteristic impedance of the line, and one-half appearing across resistance $R_0$ which is adjusted so that its impedance is approximately equal to the characteristic impedance of the line 11. A wave is propagated down the line and when it reaches the open-circuit end of the line, it is reflected with a doubling of amplitude but with no reversal of phase. This reflected double voltage pulse returns in the line and eventually arrives at the input of the line raising the input voltage to a final steady state value which is essentially equal to the input voltage. At the instant this reflected pulse arrives at the input of the line, the voltage across $R_0$ drops to essentially zero and the output voltage $V_0$ rises to approximately its full value.

The output pulse $V_0$, as formed, is shown in FIGURE 3B, first rising to a value $h$ which is approximately one-half the initial step and finally rising to the value one at the end of a time T which is equal to twice the time of transmission of the transmission line 11.

It is apparent that if the transmission line 11 has significant losses, the reflected pulses would not be as great as the transmitted pulse and the value of $h$ would be greater than one-half, considering the final value of the output normalized at unity. To compensate for the line losses, as explained previously, the potentiometer 12 causes part of the input pulse to be introduced directly into the output. The adjustable tap of the potentiometer is positioned so that the ratio of the voltage across the upper part of the potentiometer to the voltage across the very small lower part of the potentiometer is equal to the ratio of the steady state final voltage across the input to the line 11 to the voltage across the resistor $R_0$.

With proper adjustment of the potentiometer 12, it is possible to obtain a step output from the compensating section shown in FIGURE 3A which rises initially to one-half of its final value even though the final value may not be exactly equal to the input value. The amplifier 13 having a gain of $2h$ is introduced to compensate for the fact that there is some attenuation in the network. The amplifier readjusts the final steady state value of the output to be exactly equal to the input pulse.

The frequency response of the network in FIGURE 3A is shown in FIGURE 3C. As shown in the curve, the output is substantially constant until a resonant frequency of ½T is reached where T is the time of travel down the transmission line 11 and back again. At this frequency, the output voltage will drop to substantially zero. For frequencies above this frequency, the voltage will rise to unity and then at three times this null frequency (³⁄₂T), the voltage will go through a second null. A series of these nulls will occur at higher and higher frequencies. The null at a particular frequency can be utilized to cancel exactly the high resonant peak shown in FIGURE 2C which occurs in the circuit of FIGURE 2A.

The Laplace transform of the transfer function of the transmission line network shown in FIGURE 3A is as follows:

$$\frac{V_o}{V_i} = h + (1-h)\epsilon^{-sT}$$

where $h$ equals the height of the initial or first pulse or step; where $1-h$ equals the height of the second pulse or step; where $\epsilon^{-sT}$ is the time delay operator in the Laplace transform notation; where $T$ is the time between the two steps; and where $s$ is the Laplace transform complex frequency variable.

It should be pointed out that $R_0$ equals the characteristic impedance of the line only in the special case when the driving impedance $V_i$ is zero and the amplifier 13 has an infinite input impedance. For all practical systems, in order that the line 11 have only one reflected wave front and that the reflected wave front when it reaches the input of the line be completely absorbed in a network, the transmission line 11 should see its characteristic impedance looking into the network. This means that the combination of the input impedance of the amplifier 13 and the impedance of $R_0$ in series with the output impedance of the driving device must equal the characteristic impedance of the transmission line 11.

FIGURE 4A shows the resonant load of FIGURE 2A driven by the compensating network in FIGURE 3A. $R_0$ is adjusted for a single line reflection. The potentiometer 12 is adjusted for no overshoot.

The Laplace transform of the transfer function of the combined circuits shown in FIGURE 4A is equal to the product of the transfer function of the circuits shown in FIGURES 2A and 3A, and is as follows:

$$\frac{V_o}{V_i} = \frac{h + (1-h)\epsilon^{-sT}}{1 + 2\zeta\left(\frac{s}{\omega_0}\right) + \left(\frac{s}{\omega_0}\right)^2}$$

where zeta is less than 0.1.

$$T = \frac{1}{2f_n} = \text{approximately } \frac{1}{2f_0}$$

$$h = \frac{1}{1 + \epsilon^{-\pi\zeta}}$$

The transfer function of FIGURE 4A is equal to the product of the transfer functions for FIGURES 2A and 3A because the system shown in FIGURE 4A is a unilateral system in which the resonant load does not influence the output of the amplifier 13.

The step response curve for the circuit in FIGURE 4A is shown in FIGURE 4B and consists of the convolution of the two step responses shown in FIGURES 2B and 3B. This results in a half-cycle of a sine wave occurring during the time T and a constant value thereafter.

The frequency response for the circuit of FIGURE 4A is shown in FIGURE 4C and is a product of the frequency responses of the circuits shown in FIGURES 2A and 3A. Since logarithmic scales were used for plotting the frequency response curves in FIGURES 2B and 3C, the two curves are merely added together to give the curve shown in FIGURE 4C. As shown, the frequency response for the circuit in FIGURE 4A is down about 3 db at the resonant frequency. As shown in FIGURE 4D, the phase lag for the circuit in FIGURE 4A is substantially linear.

A slightly wider band-width can be achieved by reducing the length of the transmission line 11 and increasing the ratio of the first to the second pulse. The frequency response will be improved but the phase will no longer be linear with frequency. The transient rise time will be less but there will be a small overshoot.

The curves described above have been drawn for a lightly damped resonant system in which the damping coefficient zeta is quite small, something of the order of 1/10. However, my method and system has application for all values of zeta lying between zero and one. The value $h$ is so chosen that the ratio of $h$ to $(1-h)$ is equal to the ratio of $a$ to $b$ in FIGURE 1E. By computing the ratio of $a$ to $b$ in FIGURE 1E, the function of the damping of that wave, the equation $$h = \frac{1}{1 + \epsilon^{-\pi\zeta}}$$

is derived.

FIGURE 5A shows a resonant load circuit similar to that shown in FIGURE 2A but with more damping. However, zeta is larger, and closely approximates unity, and for this reason the shapes of the step response and frequency response curves shown in FIGURES 5B and 5C have a slightly different appearance. FIGURE 6A shows the required compensating section which utilizes a partially reflecting distortionless transmission line 14 and an isolating amplifier 16 having a gain of $2h$. The step response and frequency response curves are shown in FIGURES 6B and 6C. As shown in FIGURE 6B, the first pulse is much larger than the second or reflected pulse. FIGURE 7A shows the compensating section 6A applied to the resonant load 5A. The step response and frequency response curves of the circuit in 7A are shown in FIGURES 7B and 7C.

The Laplace transform of the transfer function of the resonant load circuit in FIGURE 5A is as follows:

$$\frac{V_o}{V_i} = \frac{1}{1 + 2\zeta\left(\frac{s}{\omega_0}\right) + \left(\frac{s}{\omega_0}\right)^2}$$

In the curves in FIGURES 5B and 5C $$T_e = \frac{1}{\zeta\omega_0} = \frac{1}{\zeta_n\omega_n}$$

$$\zeta_n = \frac{T}{\pi T_e} = \frac{(2T)}{2\pi T_e}$$

The Laplace transform of the transfer function for the circuit in FIGURE 6A is as follows:

$$\frac{V_o}{V_i} = h + (1-h)\epsilon^{-sT}$$

The transmission line 14 is chosen such that the reflecting impedance is much greater than $R_0$.

The Laplace transform of the transfer function of the circuit in FIGURE 7A is as follows:

$$\frac{V_o}{V_i} = \frac{h + (1-h)\epsilon^{-sT}}{1 + 2\zeta\left(\frac{s}{\omega_0}\right) + \left(\frac{s}{\omega_0}\right)^2}$$

$$f_n = f_0\sqrt{1 - \zeta^2}$$

$$\zeta_n = \tan \sin^{-1}\zeta = \frac{\zeta}{\sqrt{1-\zeta^2}}$$

$$T = \frac{1}{2f_n}$$

$$h = \frac{1}{1 + \epsilon^{-\pi\zeta_n}}$$

$$1 - h = \frac{1}{1 + \epsilon^{\pi\zeta_n}}$$

The standard procedure for determining the appropriate compensating network for the resonant load circuits in FIGURES 2A or 5A is as follows: First, the step response of the original undamped resonant system is measured. This is a curve similar to that shown in FIGURES 2B and 5B. From the equation of this curve, it is possible to calculate zeta—the per unit damping per radian of oscillation. The envelope of oscillation is then drawn and the time constant determined. This time constant $T_e$ is measured directly from the transient envelope decrement and is equal to $$\frac{1}{\zeta_n \omega_n}$$

where $\omega_n$ equals $2\pi$ times the natural frequency of oscillation. The frequency of oscillation can be measured in terms of the period of the envelope, the period being $2T$. From these relationships $\zeta_n$ can be calculated and it is found that $\zeta_n$ equals the period of the transient divided by $2\pi$ times the time constant of the envelope of the transient.

The values of $h$ and $1-h$ may then be calculated directly from $\zeta_n$. When the values of $h$ and $1-h$ have been determined, the gain of the isolating amplifier and the adjustment of the reflecting resistance at the open circuit end of the transmission line can be calculated. They are calculated so that the ratio of the pulses applied to the LC circuits are in the ratio of $h$ to $1-h$, therefore, the ratio of the first to the second pulse.

The frequency response curves in FIGURE 8 are the same curves as shown in FIGURES 2C, 4C, 5C and 7C. These curves are obtained in a manner already discussed. The curves have been marked with the figures from which they were taken to make them easier to identify.

The phase lag curves shown in FIGURE 9 are obtained in a similar manner. As pointed out previously, the network in FIGURE 3A introduces a lagging phase lag for frequencies below resonance and a leading phase lag for frequencies above resonance in an amount just sufficient to make the result of the two phase lag curves equal the value shown in curve 4D which is substantially a phase lag linear with frequency. This is the optimum type curve for the best reproduction of wave shapes.

In the systems hereinafter described, block diagrams will be used to represent the reflecting transmission line and the resonant section. For example, the systems shown in FIGURES 4 and 7 would be represented by block diagrams as shown in FIGURES 10A, 10B and 10C. The block 21 in FIGURE 10A represents a reflecting transmission line and the block 22 represents the resonant component. From a practical engineering standpoint, it is best to introduce this control as a correction factor to be added to the normal input rather than a plurality of input steps divided into two half steps or partial steps. For example, when the normal input command is a unit step, the correction factors or control commands would be a negative step of less than one-half unit followed at a later time by a positive step of equal amount. The representation of these control commands is shown in block 23 of FIGURE 10B where (1) stands for the normal input and P stands for the pulses or control commands generated to compensate for the resonant system. The block $1+P$ is the transference of a complete reflecting transmission line equal to $h+(1-h)\epsilon^{-sT}$. P alone is a pulse generator with no steady-state gain factor. The generator delivers a pulse of amplitude $1-h$ of negative value for a unit step input. This pulse lasts for one-half cycle and then terminates.

The two components of the command signal are shown in the block diagram in FIGURE 10C in a manner well known to those skilled in the art of servo mechanism design. The normal input command is represented by the block 24 and the control command is represented by the block 26. The control command is the output of the block 26 which delivers for a step input a negative pulse of amplitude $1-h$. The control command is added to the input command and the resultant command drives the actual system. The block P turns off at the time T and therefore it has zero D.-C. gain. Because of this, the block P or 26 does not influence the steady-state accuracy of the system but only controls the magnitude of the oscillatory transients. The block 26 does not have to be carefully designed because it does not influence the steady-state errors. It can be an approximation to a pulse generator which is adjusted empirically to resolve into a dead-beat response for the system as a whole.

As hereinafter described, pulse generators like P can be tapped actual transmission lines, lumped-parameter artificial lines, pneumatic lines, lumped-parameter artificial pneumatic lines or ultrasonic lines, mechanical transmission lines, digital computers programmed for delay, or the equivalent achieved with magnetic tape or other recording, memory, or delay means.

The following systems hereinbefore described have been designed for one-half cycle response. There are two vectors introduced at 180° apart and at such a magnitude that they cancel completely for all times after the second vector is introduced. Since the vectors are 180° apart, the input transient has to be divided into two parts and the time between the introduction of the two parts has to be one-half cycle of the resonant system. For this reason, the time during which the transient is observable is one-half cycle and for that reason is called a one-half cycle response. The system which we will now describe will be more complex in that the transients are completely over in less than one-half a cycle, as for example one-fourth of a cycle.

The mode of action for achieving one-quarter period or cycle response can best be explained by reference to FIGURES 11 and 12. If one were to apply to a resonant system the pulses shown in FIGURE 11, a transient output response of the type shown in FIGURE 12 would be obtained. However, to achieve this result, the compensating section must deliver a positive step first, a negative step after a short delay, and a final positive step. For example, as shown in FIGURE 11, the first positive step could be 1.7 units high lasting for a time interval equal to ⅛ of the period of the resonant system, the negative step of $-0.707$ in height for a time interval equal to ⅛ of the period of the resonant system, and the final positive step of unity.

The response of the resonant system to this series of steps is shown in FIGURE 12. As shown in dotted lines, the system starts to oscillate, starting off on a negative cosine wave whose ultimate peak is 3.4 units high. However, it moves only a one-half unit before the interval of ⅛ period has elapsed and at this instant the negative step is applied to reduce acceleration and to cause the output to diminish. The output, therefore, begins to diminish its derivative and will attempt to oscillate about $-.707$ unit except that when it reaches its zero derivative with a total deflection of one unit, a total interval of ¼ the period has elapsed and the compensating section suddenly shifts to its final value of one unit. The compensating section has an output of one unit at this instant and the highly resonant circuit also has an output of one unit with a zero derivative at this same instant. It will, therefore, remain at this value with no oscillations or further transients. The total movement of the output variable from its initial to its final value has been one-fourth period.

In other words, the three step inputs to the resonant load excite three transients. Each can be represented by a decaying vector. The sum of the three vectors at any time after the last input step must be zero for the transient response to have no overshoot. The arithmetic sum of the three steps is the steady-state output. For very short transient times (very wide band width), the first accelerating force and the second braking force must be very large compared to the final step and to the D.C. gain.

FIGURE 13 is a schematic diagram showing a compensating section which can be used to drive the circuit shown in FIGURE 2 to achieve one-quarter cycle response. The compensating section consists of a transmission line broken into two sections, 27a and 27b, a buffer amplifier 28, resistors 29, 31, 32 and 33.

Let it be assumed that the input command is applied to the input terminals of the circuit shown in FIGURE 13. The voltage of the input command is divided between the distortionless delay line 27a and the resistor 31, the delay line having a characteristic impedance equal to the resistor 31. It is, therefore, apparent that the buffer amplifier 28 only has one-half the input command initially impressed across it. A wave front of one-half unit in height propagates down the first distortionless delay line 27a and when it reaches the resistor 29, part of the wave front is reflected and part continues to travel on.

The mechanism of the reflection can be determined from examination of the impedances concerned. For example, if the impedance of resistor 29 is equal to 0.707 of the impedance of resistor 31, and the characteristic impedance of the distortionless delay line 27b is equal to 0.414 of the impedance of resistor 31, the input impedance of the parallel combination of resistor 29 and the delay line 27b is equal to approximately 0.3 of the impedance of resistor 31. This is a very low impedance for termination of the transmission line 27a and acts like an imperfect short circuit. This imperfect short circuit will reflect a reverse voltage down the first delay line 27a of a magnitude not quite equal to the input wave front. The ratio of the incident to the reflected waves can be computed from the ratio of the characteristic impedance to the imperfect shorting impedance. If this shorting impedance were zero, then the middle pulse shown in FIGURE 11 would be $-1.707$. Since we wish to have a pulse value of only $-0.707$, an imperfect shorting impedance is required.

When the reflected wave front arrives back at the input of the first delay line, it is absorbed into the resistor 31 and there are no further reflections. However, the voltage across the input to the amplifier 28 has now been driven negative and it will stay negative until further actions occur. These further actions are due to the second distortionless delay line 27b. Delay line 27b has impressed across its input a pulse which was transmitted from the first delay line and which continues to flow and propagate down the second delay line. When this pulse eventually reaches the open circuit terminals of the second delay line, it is reflected without change of phase and with essentially double magnitude. This pulse of double magnitude then propagates back through the second distortionless delay line and arrives at the parallel combination of the resistor 29 and the input impedance of the delay line 27a. This parallel combination is exactly equal to .414 of the resistor 31 which is the surge impedance of the second line 27b. Therefore, the wave front which is returning from the second delay line 27b passes directly into the first delay line with no change in voltage and with no reflection because there is apparently no discontinuity to the reflected wave. The wave propagates through the first delay line and eventually arrives at the resistor 31 where again the impedances are matched and the wave passes out of the first delay line at a voltage of one unit with reference to FIGURE 11 or an actual voltage of one divided by 5.3 with reference to FIGURE 13.

The sequence of pulses is impressed across the input of the buffer amplifier 28 and in order for the output of the buffer amplifier to have the same level as the input to the system as a whole, a gain of 5.3 units is required. After the gain of 5.3 units has been applied, the output of the buffer amplifier in FIGURE 13 has units equal to those shown in FIGURE 11. This is the sum of the input and control commands for one-fourth period response of a lightly damped resonant component and can be used in place of the block $1+P$ in the circuit of FIGURE 10B.

The circuit in FIGURE 13 is provided with a tap 34 at the intersection of resistors 32 and 33. The purpose of the tap is to adjust the level of the output so that the pulses have the relationship shown in FIGURE 11. The actual pulses obtained at the intersection of the resistor 31 and the distortionless delay line 27a will all be positive in magnitude. They will vary between various positive values but will never go to an absolutely negative potential with reference to the lower terminal of the input when the input has a unit positive step applied to it. Therefore, in order to obtain the reversing character of the second pulse from these lines, the output must be taken across two terminals of the network consisting of resistors 31, 32 and 33 shown in FIGURE 13. This network is so chosen that when the delay lines 27a and 27b are absorbing voltage, the output is positive but when the reflection from the first delay line 27a arrives back at the input, the reflected voltage actually drives the voltage impressed across the buffer amplifier 28 to a negative potential because the other terminal of the buffer amplifier, that is the terminal connected to resistor 33, is held at a higher positive potential. Resistor 32 has a resistance of 3.41 times the value of resistor 33.

FIGURE 13, as shown, has been designed specifically for a quarter period control. The values of the impedances given above are unique for the quarter period control. However, the principal operation of this circuit is applicable to all types of control in which the transient is faster than one-half period. As hereinbefore explained, for all types of control in which the transient is faster than one-half the period, the compensating device as shown in FIGURE 13 must deliver three step functions. By adjusting the parameters of the circuit in FIGURE 13, the circuit can be made to deliver large pulses of very short duration which when applied to a circuit such as that shown in FIGURE 2, can achieve a step response which is aperiodic, with no overshoot, which is tangent to and reaches its final steady-state value in any arbitrary very short portion of the cycle.

However, with very short transient times, the magnitude of the pulses must be very great. This type of control, although theoretically possible, is not feasible because of the extremely large amplitudes of the pulses delivered from the control command circuit and it is possible that these pulses may saturate or in some other manner drive the amplifiers or transducers into non-linear regions. With one-quarter cycle response, the possibility of such saturation is not great.

The complete transference of the reflecting line section in FIGURE 13 is:

$$\frac{\left(k-2k^{1/2}\left(\cos\frac{\omega_n T_r}{2}\right)\epsilon^{-sT_r/2}+\epsilon^{-sT_r}\right)}{\left(k-2k^{1/2}\left(\cos\frac{\omega_n T_r}{2}\right)+1\right)}$$

where $T_r$ is the overall response or transient time; where $f_n$ is the natural transient frequency of the component being driven; and $$\omega_n = 2\pi f_n = \omega_0\sqrt{1-\zeta_n^2}$$

$$k = \frac{\zeta\omega_n T_r}{\sqrt{1-\zeta^2}}$$

It will be noted that with reference to FIGURE 13, the transfer functions have been written in terms of "$k$'s" rather than in "$h$'s" as for the other figures. This is because the variable $h$ has been chosen for the special case of one-half period response. However, in FIGURES 11, 12 and 13, I have introduced the concept of less than one-half period response. The circuits for achieving less than one-half period response have more complex transfer functions in which I have introduced the variable $k$.

It can be shown in the above equations for FIGURE 13 that for the special case where $T_r$=one-half period $\omega_n T_r$ equals $\pi$. The equations then simplify down to a two step instead of a three step driving function.

In FIGURE 14A I have shown a complex stable but lightly damped oscillatory feedback system represented by the block G with negative feedback from the output, $\theta_0$. In particular, the block G is shown with several minor feedback branches around it. By this I intend to show that this is a complex system of unknown nature and that the design of the means for generating the control commands can be achieved without a knowledge concerning the internal structure of the complex feedback system. All that must be known is the resonant frequency and the transient envelope time constant for the overall complex feedback system. A $1+P$ block for generating the control commands is included in the diagram shown in FIGURE 14A and can consist of a network similar to that shown in FIGURE 13. Two or more pulses can be generated by the $1+P$ block in such a manner that the vector oscillation excited by these pulses in the system cancel out after the last pulse enters the system.

In FIGURE 14B I have shown a block diagram satisfactory for servo mechanism work in which the control from the block $1+P$ is divided into two parts: the normal input $\theta_i$, and a multiple control command generator P which adds a high frequency to the error signal, but has no steady-state transference. For faster than half-cycle control (three driving functions), the transference P in FIGURE 14B is as follows:

$$P = \frac{-2k^{1/2}\left(\cos\frac{\omega_n T_r}{2}\right) - 1 - 2k^{1/2}\left(\cos\frac{\omega_n T_r}{2}\right)\epsilon^{-sT_r/2} + \epsilon^{-sT_r}}{k - 2k^{1/2}\left(\cos\frac{\omega_n T_r}{2}\right) + 1}$$

$$P = (K_0 + K_1 \epsilon^{-sT_r/2} + K_2 \epsilon^{-sT_r})$$

where $$K_0 = \frac{2k^{1/2}\left(\cos\frac{\omega_n T_r}{2}\right) - 1}{k - 2k^{1/2}\left(\cos\frac{\omega_n T_r}{2}\right) + 1}$$

$$K_1 = \frac{2k^{1/2}\left(\cos\frac{\omega_n T_r}{2}\right)}{k - 2k^{1/2}\left(\cos\frac{\omega_n T_r}{2}\right) + 1}$$

$$K_2 = \frac{1}{k - 2k^{1/2}\left(\cos\frac{\omega_n T_r}{2}\right) + 1}$$

$$K_0 + K_1 + K_2 = 0$$

For the special situation of one-half cycle control:

$$K_0 = -(1-h)$$
$$K_1 = 0$$
$$K_2 = +(1-h)$$

and $$k = \frac{h}{1-h}$$

The control commands are derived from the input by the block P which delivers first a positive pulse, and second a negative pulse following any step change in the input $\theta_i$. After these two pulses, the output of the block P drops to zero and remains at zero thereafter in accordance with the above equation for P. In this form it can be seen that steady-state errors in P will not disturb the system.

The system shown in FIGURE 14B is fail safe because if the block P is disabled, shorted or removed, the system will still operate in a safe manner, the output following the input for slow steady-state changes in input although the system might be unsatisfactory from a transient response viewpoint.

Since the P block passes only the high frequencies, it is only necessary for it to be a high frequency equivalent circuit. Also, the P block need not have exactly the transfer function of the equation given for P above. For these reasons it is possible to build a variety of approximations to this transfer function which when introduced into the location for block P will work quite satisfactorily from an engineering standpoint.

In FIGURE 15 I have shown a circuit diagram for the P block in FIGURE 14B. As pointed out above, the circuit in FIGURE 13 is equivalent to the $1+P$ block in FIGURE 14A. The $1+P$ block in FIGURE 13 delivers a steady-state output but does not have zero D.-C. gain. The transmission line part of the circuit shown in FIGURE 13 is equivalent to the P block in FIGURE 14B. The P block has zero D.-C. gain and delivers pulses similar to that shown in FIGURE 11 minus one, as shown in FIGURE 16.

The circuit shown in FIGURE 15 consists of a control amplifier 34 having a high impedance input. The input to the control amplifier 34 is the difference between two signals. One of these signals is the desired value for the output and the other signal is the actual value of the output variable. These are shown in FIGURE 15 as the input and feedback from the output. They are connected in series in such a manner that the voltage impressed across the input of the control amplifier is equal to the desired input minus the feedback from the output.

In order to introduce the control command generated by the block P as shown in the FIGURE 14B, the output of the block P must be added to the error signal which is shown as $\theta_e$ in FIGURE 14B. In FIGURE 15, the error signal is also shown as $\theta_e$ which is the voltage on the terminal $c$.

The control commands are generated by changes in the input. The input is coupled for higher frequencies through the capacitor 35 and the isolating transformer 36 to a tapped potentiometer 37 consisting of sections 37a and 37b. The potentiometer 37 is connected to a distortionless delay line 38 through a series resistor 39. Delay line 38 is connected to terminals $a$ and $b$, and terminals $a$ and $b$ are connected to a second distortionless delay line 40 through a series resistor 41. Delay line 40 terminates in a resistor 42.

To facilitate description of the operation of the circuit shown in FIGURE 15, let it be assumed that the impedance of resistor 39 is equal to the characteristic impedance of the delay line 38, that the impedance of resistor 41 is equal to three times the characteristic impedance of the delay line 38 and that the characteristic impedance of the delay line 40 is equal to four times the characteristic impedance of delay line 38. Let it also be assumed that the ratio of the sections 37a and 37b is 25 to 3, respectively. Operation of the circuit in FIGURE 15 may now be described as follows.

A positive input step change causes a portion of the voltage to appear across the section 37b of the potentiometer 37. This serves to drive the control amplifier 34 positive initially. A step of half voltage is propagated down the delay line 38 and when it reaches the impedance discontinuity at terminals $a$ and $b$, the impedance encountered (resistor 41 and delay line 40) is equal to seven times the characteristic impedance of the delay line 38 and, therefore, all but $\frac{1}{7}$ of the wave will be reflected. Thus, a half voltage step jumps to $\frac{6}{7}$ voltage. The reflected wave passes back through the delay line 38 with approximate doubling of the voltage until it arrives back at the resistor 39. At the instant it arrives back at the resistor 39, the wave front is completely absorbed and excites no further transients.

When the initial positive input step is impressed across the isolating transformer 36, the terminals $c$ and $d$ will receive ⅜ of this initial voltage due to the relationship of the sections 37a and 37b of the potentiometer 37.

After the wave front has propagated down the first delay line 38 and has been impressed across the terminals $a$ and $b$, the second delay line 40 begins to charge up and ⅜ of the voltage across terminals $a$ and $b$ appears across the resistor 41. At this instant of time, the potentials across the terminals $c$ and $d$ will be the difference between ⅜ voltage and ⅜ voltage. Since the ⅜ voltage is much larger than the ⅜ voltage which was across the terminals $c$ and $d$, the polarity on terminal $d$ will be reversed. Thus, if $d$ had been positive with respect to terminal $c$, $d$ will now be negative with respect to terminal $c$. This is true because the potential on terminal $c$ goes so much farther positive than the potential on terminal $d$ that it is possible to get both the positive and negative polarities of $d$ with respect to $c$.

The wave front that is propagated down the relay line 40 propagates down that delay line until it reaches the end of the line where it is terminated in resistance 42. Resistance 42 has an impedance which is equal to 24 times the characteristic impedance of the delay line 38 and for that reason acts substantially as an open circuit. The wave front is, therefore, doubled and returns back down the delay line 40 and eventually appears at the input of the delay line 40. At this moment, the delay line 40 is charged up to its final steady-state voltage value and the current entering the line will drop to essentially zero. Actually, it only drops to a very low value because of the loss in the line and the terminating impedance 42. This sudden drop of current flowing through the resistance 41 will then suddenly diminish the voltage on terminal $c$ and will in fact bring the voltage on terminal $c$ to a value exactly equal to the voltage on terminal $d$.

This desirable result is achieved by properly selecting the various resistors and terminating impedances in the circuit so that when lines 38 and 40 are charged, the currents flowing through resistance 39, the delay line 38, the delay line 40, and the resistance 42, will produce altogether a voltage drop equivalent to the voltage drop across the section 37a so that this voltage drop bears the same relationship to the voltage drop in resistance 42 as the voltage drop in the section 37a bears to the voltage drop in the section 37b.

After the reflected wave from the delay line 40 reaches terminals $a$ and $b$, it continues on through the first delay line 28 and passes through delay line 38 and is absorbed by resistor 39, and thus creates no further change in the conditions in the circuit. In this manner, a control command is generated and fed directly into the input of the control amplifier 31.

From the foregoing, it can be seen that the high frequency components of the input representing changes in the input are coupled into a pair of reflecting transmission lines 38 and 40 in such a manner that there is introduced into the control amplifier 34 a control command consisting of two compensating pulses appearing across the terminals $c$ and $d$, the first pulse being highly positive, the second pulse being highly negative and the final value returning to zero in such a manner that the two pulses first excite and then quench the oscillations in the system consisting of the control amplifier 34 and the devices which it controls.

The magnitude of the pulses delivered at the terminals $c$ and $d$ in FIGURE 15 are shown in FIGURE 16 for the special case of one-fourth period control. This FIGURE 16 is a representation of the step response of the transference $P$, whereas FIGURE 11 is a representation of a step response of transference $1+P$.

The values of the components in the network or circuit shown in FIGURE 15 have been chosen with reference to the losses in the delay lines 38 and 40 and in the terminating impedances so that the D.C. output or the steady-state output of the transmission lines 38 and 40 is zero after a specified length of time. In the foregoing example, the transmission lines had time delays of $T/16$ where $T$ is the transient period of one cycle of oscillation. The isolating transformer 36 must be a voltage step-up transformer because of the necessity of obtaining changes in the order of 1.7 units across the terminals $c$ and $d$ when $d$ is negative for one unit of positive step change in the input.

It can be seen from FIGURES 10B and 10C that the distinguishing feature between a control with a $1+P$ block and a control with a P block alone is that the P block can be removed without disabling the entire system. By disabling the P block, in FIGURE 10B, the circuit can be returned to the conventional type of system. For example, in FIGURE 15, this can be accomplished by closing a switch (not shown) across the terminals $c$ and $d$.

Since the portion of the circuit representing the P block in FIGURE 15 can be easily disabled, it can be easily removed and replaced by other types of circuits. For example, one could build a system with plug-in units for the part of the circuit consisting of the P block so that one unit would have one-half cycle response, another unit one-fourth cycle response, another one-eighth cycle response, and so forth. The circuit in FIGURE 15 is relatively fail-safe in case of accidents because changes in the characteristics of the delay lines 38 and 42 will not alter the steady state values that are passed into the control amplifier by the input.

A circuit of the type shown in FIGURE 13 does not have these advantages. Changes in the gain of the amplifier, changes in any one of the resistances or losses in any of the delay lines will actually alter the steady-state gain between the input and output and, therefore, will alter the correspondence between the system output and the desired system output. Thus, the distinct advantage of the circuit shown in FIGURE 15 is that even though the characteristics of the delay lines 38 and 40 and all the other components in the circuit may vary, the steady-state transfer function from the input to the terminal $cd$ through the delay lines and the other components always returns to zero for inputs which are not changing. For this reason, a system of the type shown in FIGURE 15 can never get out of adjustment as far as the D.C. gain is concerned. This is an important characteristic of the control system since it is the D.C. gain that controls the correspondence between the output and the input.

As hereinbefore described, my invention has been defined in terms of electrical systems primarily because of the convenience of terminology and notation in electrical circuits. However, it is not intended that this invention be limited to electrical systems and in fact my invention should have its greatest applications in pneumatic, hydraulic and electromechanical systems.

As is well known, the field of control usually involves the interaction of different types of systems as, for example, the use of electrical motors to control mechanical positions, the use of hydraulic motors to control mechanical positions, or the use of pneumatic valves to control fluid flow which then controls temperature. My invention is applicable to all types of oscillatory control systems regardless of the branch of dynamics concerned.

As an example of a pneumatic application of my invention, I have shown in FIGURE 17 a schematic diagram of a pneumatic system which is the analog of the electrical system shown in FIGURE 13. The system shown in FIGURE 17 can be used in a system which has pneumatic transmission of information and pneumatic processing of this information. This is common in process controls for controlling flow, liquid levels, temperature, reaction rates and chemical compositions. In many of these systems the desired set point of the system is entered as an adjustment on pneumatic controllers. The feedback information is fed into the controller as the pressure of a pneumatic line which is determined by a suitable device such as a mechanical or pneumatic transducer. This information can subsequently be used to drive a pneumatic amplifier which then may drive a highly oscillatory system. The type of operation to be performed is analogous to that which is performed in FIGURE 13 in which the input information goes directly into the control amplifier and a secondary control command is generated by delay lines.

It will be recalled that the electrical system shown in FIGURE 11 has a unity D.C. gain and delivers pulses above and below this value satisfactory for smaller than half period control of the resonant systems. The system shown in FIGURE 16 delivers equivalent pulses of pressure for making possible better than half period control of the resonant pneumatic system.

The pneumatic system shown in FIGURE 17 consists of a pneumatic transmission line 43 which is fed through an orifice 44. The orifice 44 performs the same function as the series resistance in an electrical analog. After an input step of pressure, a pulse of pressure is transmitted through the orifice 44 into the line 43 and is propagated down the line 43 and passes a side orifice 45 which opens to the atmosphere. At this point in the line, the pneumatic impedance drops considerably below the characteristic impedance of the line 43 and a reflected pulse of reverse phase, that is, a sudden drop in pressure is reflected back from the orifice 45 through line 43 back to the input orifice 44. The input orifice 44 has essentially the characteristic impedance of the line and when the drop in pressure arrives at the orifice 44, the transient is absorbed.

At the same time that the initial pulse passes the orifice 45, the pulse will continue down the transmission line 43 past the orifice 45 and continue to do so until it reaches the closed end of the transmission line 43. The closed end of the transmission line is equivalent to an open circuit in an electrical analog. At the closed end, the pressure of the air is essentially doubled and this double pressure is transmitted back down the line 43 to the input orifice 44.

All the changes in pressure at the input orifice 44 are measured by a side port 46 which is connected to a Sylphon differential pressure measuring device 47 which includes a Sylphon 48 and an arm 49 actuated by the Sylphon. One side of the Sylphon is responsive to air pressure from the port 46, whereas inside of the Sylphon is responsive to air pressure from a port 50. Port 50 is connected to the input of the system by an extension 51 having orifices 52 and 53 on opposite sides of the port 50. Port 53 opens to the atmosphere. Orifices 51 and 53 are proportioned in such a manner that a very small proportion of the input pressure appears in the port 50. The arm 49 is utilized for controlling the flow of fluid from a nozzle 56 which is a part of a pneumatic differential amplifier (not shown) of a type well known to those skilled in the art. Examples of such amplifiers can be found in Rantz's book on "Servo Mechanisms Practice," published by McGraw-Hill.

When a positive step of input pressure is applied to the system as shown in FIGURE 17, the pressure in the port 46 will exceed the pressure in the port 50 and will cause the lower end of the arm 49 to swing to the right as viewed in FIGURE 17 or away from the jet nozzle 56. When the first reflected pulse comes back from the orifice 45, the lower end of the arm 49 will suddenly move to the left and when the final reflected pulse comes back from the closed end of the transmission line 43, the lower end of the arm 49 will again move to the right. Then the arm 49 will attain a new steady-state position dependent upon the input pressure $\theta_i$. The device has steady-state gain.

In FIGURE 18 I have shown the pneumatic analog of the electrical system shown in FIGURE 15. As hereinbefore described, the system in FIGURE 15 does not have unity steady-state gain but zero steady-state gain. The pneumatic system shown in FIGURE 18 consists of a pair of transmission lines 61 and 62 which are fed by ports 63 and 64, respectively. The ports 63 and 64 open into an extension 66 which is provided with an opening 67 for the application of input pressure $\theta_i$. The transmission line 61 is connected to a Sylphon differential pressure measuring device 47 similar to that shown in FIGURE 17 by a port 68. The other side of the device 47 is connected to an extension 69 by a port 71. The extension 69 is provided with orifices 72 and 73, orifice 72 opening into transmission line 62 and orifice 73 opening to the atmosphere.

When a positive pressure pulse is applied to the input opening 67, the pulse propagates through the port 63 and continues down the transmission line 61 until it reaches port 68 where the pressure is measured by the measuring device 47. The pressure pulse continues down the transmission line 61 until it reaches the open end of the transmission line where the pressure suddenly drops to zero. This zero pressure wave is transmitted back down the line 61 and passes over the port 68, dropping the pressure at port 68 to zero and continues back down the transmission line 61 until it reaches the orifice 63.

The pressure pulse which passes through the orifice 64 passes over the orifice 72 and goes down the line 62 until it reaches the open end of the line where the pressure drops to zero. The zero pressure pulse is propagated back down the line 62 until it reaches the orifice 64. The pressure changes occurring at orifice 72 are measured by the series combination of orifices 72 and 73 which take a proportion of the pressure at the orifice 72 and pass it through port 71 into the Sylphon measuring device 46. At the port 71 there will be a pulse of positive pressure lasting for the time of transmission for the pulse down the line 62 and back. At port 68 there will be a positive pulse of pressure corresponding to a sudden increase in the input pressure and one which is delayed in appearance for a time equal to the time of transmission down the line 61 and which lasts for an additional time equal to the time of transmission and reflection of a pulse down and back in the line 61 past the port 68. The combination of these two pulses will cause the Sylphon or vane 48 to first move downwardly as viewed in FIGURE 18 toward the jet nozzle 56 and then up due to the succeeding pressure pulse in the port 68 and to finally return to its steady-state undeflected position.

The systems and methods hereinbefore described have not been suitable for compensating for load disturbances. It is well known that in lightly damped oscillatory feedback systems, load changes can excite oscillations which persist for an undesirable period of time. In FIGURE 19 I have shown a block diagram of an unsatisfactory feedback system which is stable, but which has lightly damped oscillations when the input $\theta_i$ or the load $\theta_L$ is changed. In FIGURE 19, the output variable to be controlled is represented by $\theta_o$. The output variable $\theta_o$ is measured and a feedback signal $\theta_f$ which is proportional to the output variable is fed back to the input of the system.

The block F represents the Laplace transform of the measuring device which measures the output variable and delivers a signal proportional to it. However, often the signal $\theta_f$ is in a different form than the output variable. For example, if the block F is a transducer such as a synchro to measure position, it delivers a voltage as the feedback signal, or it could be a thermometer to measure temperature and which delivers a signal voltage.

The desired value of the output variable is $\theta_i$. The difference between the desired value of $\theta_i$ and the measured value $\theta_f$ is called the control signal $\theta_a$. The control signal $\theta_a$ enters a high gain amplifier $G_1$ which usually contains compensating or phase lead elements to guarantee the stability of the system as a whole. The feedback amplifier $G_1$ delivers a signal to a high power amplifying device which delivers a signal to a transducer. The transducer depending upon the nature of the system may be in the form of a pneumatic to steam flow transducer or a hydraulic pressure to position transducer, or an electrical to mechanical transducer. The output of the transducer which will be termed torque will be exerted against the inertia of some load member to produce the desired output variable $\theta_o$, which in some cases may be the position of an inertia.

The disturbances which may enter the system shown in FIGURE 19 are represented by $\theta_L$. The disturbances may come in the form of noise in any one of the amplifiers, variations in the voltages of the power supplies or voltages applied to the vacuum tubes. The disturbances may also take the form of variations in pressures available from high pressure air systems or from hydraulic reservoirs. They also may enter as wave forces on the rudder of a ship or as loads such as variations in current from the output of a voltage regulator or as torque such as wind torque on the antenna of a radar unit. These load disturbances as hereinbefore explained are represented as some function of $\theta_L$ which enters the system and has some transference between the disturbance torque and the output member. This transference is shown as block $G_2$ which represents the Laplace transform of the transference.

It is apparent that the block diagram shown in FIGURE 19 represents the problem presented for controlling the output $\theta_o$ of a system so that it will follow an input command $\theta_i$ in the presence of undesirable disturbances $\theta_L$.

FIGURE 20 shows a block diagram for a feedback system which includes compensation for load disturbance transients as well as input transients. The block $P_i$ is analogous or identical to the P block utilized in the systems hereinbefore described. The $P_i$ block can be designed for quarter cycle response or any other desired speed of response. The $P_i$ block operates only when the input is changed suddenly and will deliver pulses designed to quench any oscillation of the system as a whole which may be due to input transients. The block $P_o'$ operates to quench any oscillations in the system as a whole which may be due to disturbance transients.

It should be pointed out that the system shown in FIGURE 20 without the blocks $P_i$ and $P_o'$ is a feedback system which taken as a whole is a lightly damped resonant system which does not contain any one component which is in itself a lightly damped resonant system. This is to be distinguished from the systems hereinbefore described such as shown in FIGURES 5, 8 and 10 wherein a component itself is lightly damped and it is desired to quench the oscillations within this component.

The blocks $G_1$ and $G_2$ as shown in FIGURE 20 are the same type as shown in FIGURE 19. The block F is also of the type described in FIGURE 19. The block $$\frac{1}{G_1 G_2 F}$$

is a filter which represents the Laplace transform of the loop reciprocal transference as hereinafter described.

The block $P_o'$ receives its input from the error signal $\theta_a$ and the feedback signal $\theta_f$. The block is designed so that it will deliver pulses which will cancel the transient vector oscillations induced by load disturbances.

The block $P_o'$ is so located in the system that when disturbances $\theta_L$ cause sudden changes in the signal to the block $P_o'$, the block $P_o'$ will generate a series of pulses which first drive the amplifier and associated transducers represented by block $G_1$ to over compensate for the disturbance transient and then secondly to drive the amplifiers and transducers represented by $G_1$ to under compensate for the disturbances. This is done in such a manner that after a predetermined interval when the output of $P_o'$ drops to zero, the actual output value of the controlled variable $\theta_o$ is exactly equal to the steady-state value which is the value of the controlled variable $\theta_o$ would have achieved after a much longer length of time in the system without the block $P_o'$. The $P_o'$ block is comprised of a block $P_o$ with unity negative feedback designated by $g$ from the output to the input of $P_o$.

The block $P_o'$ as shown derives a portion of its input from a filter which is represented by the block $$\frac{1}{G_1 G_2 F}$$

The filter should have a transfer function which is equal to the reciprocal of the loop transfer function in order to operate on the feedback variable $\theta_f$ and deliver the desired signal. It is not necessary that the filter have a wide frequency band because the block $P_o'$ operates only at very high frequencies and has no output at low frequencies. The lowest frequency at which the filter needs to be accurate is in the order of the magnitude of the resonant frequency which is a frequency such that the block $$\frac{1}{G_1 G_2 F}$$

has a gain of approximately unity. Therefore, the frequency band for which the filter must have a valid transference, that is, a transference which approximates the inverse loop transference, must be the range from approximately zero db up to approximately 20 db gain. This corresponds to the range at which the phase shift is in the order of 180°. The phase of the $$\frac{1}{G_1 G_2 F}$$

block will be in the order of 180° phase lead.

The designations $r$, $m$, $n$ and $q$ represent the signal on the conductor with which the letter is associated as hereinafter described.

FIGURE 21 is another block diagram which has been derived from the block diagram of FIGURE 20 by linear block diagram substitutions in a manner well known to those skilled in the art. The block diagram in FIGURE 21 has been derived for pedagogical purposes to show the effect of the blocks in FIGURE 20.

It can be seen from FIGURE 21 that it states that the load disturbances enter the system as though they had come through a block $1+P_o$ which, generally speaking, would look as though the load disturbance had entered in an excessive amount initially and then in a negative amount a short time later and then finally restored to a final value. If a load disturbance follows such scheduling, it will not excite transients in the feedback system and the feedback system will move from its initial to its final value, the value being determined by the change in the load in a small portion of a cycle without transient oscillations.

Each of the two blocks $P_i$ and $P_o$ can be chosen independently of the other. For example, it is possible to have ⅙ period response with respect to input transient changes and ½ period response with respect to load transient changes. This is generally desirable should one not wish to cause the output to correct for load transient changes quite suddenly. The output may follow the load transient changes with the least possible speed which will not excite oscillations, which is a ½ period response.

To illustrate the action of the system in FIGURE 20, the following specific example will be given. Let block $G_1$ equal a gain of 100, block $G_2$ have time constants with a high frequency gain of unity, block F a gain of unity and block $P_o'$ be designed for ½ cycle response wherein $P_o$ is $(-½+½\epsilon^{-sT_r/2})$. If a step of 100 units is added at $\theta_L$, the ordinary corrective action would drive the output of $G_1$ 99 units negative. In this embodiment, the output of $G_1$ will initially go 99.505 units negative, and $\theta_o$ will go .49505 unit positive. $\theta_e$ which is one component of the input to $G_1$ will go 0.49505 unit negative. The output from the block $$\frac{1}{G_1 G_2 F}$$

initially goes 0.005 unit positive. Since the block $P_o$ has an initial gain of −½ and g is negative feedback, the initial gain of the feedback loop from n to q is −1. n is the sum of m and −r and is initially plus 0.5 unit. q is, therefore, −0.5 unit, and $\theta_c$, the input to $G_1$ is r plus q, or −0.495−0.5, which is −0.99505 unit. This times the gain of $G_1$, 100, is −99.505, the actual initial corrective force at the output of $G_1$. After the delay time in $P_o$, $P_o$ delivers a sudden positive step of 0.5 unit, which brings q and g back to zero units change. The output of $G_1$ jumps to −99.01 units, and $\theta_e$ becomes −0.99 unit.

If $G_2$ and F contain dynamic elements with phase lag, the start of an oscillation may be superimposed upon the figures previously given. In this case, the delayed pulse output from $P_o$ is of the correct magnitude, polarity and timing, so that the oscillation is completely cancelled. The transient from $\theta_a$ to the input of the block $P_o$ (signal r) may be a high frequency pass connection only since $P_o$ has zero steady-state gain.

The dotted block $P_o'$ enclosing the block $P_o$ and the negative feedback branch giving a signal g can be replaced by an equivalent single tapped transmission line with transference $P_o'$ equal to:

$$P_o' = \frac{P_o}{1+P_o} = \frac{K_0 + K_1 \epsilon^{-sT_r/2} + K_2 \epsilon^{-sT_r}}{1+K_0+K_1\epsilon^{-sT_r/2}+K_2\epsilon^{-sT_r}}$$

$$P_o' = 1 - \frac{1}{(1+K_0)\left(1+\frac{K_1}{1+K_0}\epsilon^{-sT_r/2}+\frac{K_2}{1+K_0}\epsilon^{-sT_r}\right)}$$

$$P_o' = 1 - \left(\frac{1}{1+K_0}\right)(1-x+x^2-x^3+x^4- \ldots)$$

where $$x = \left(\frac{K_1}{1+K_0}\right)\epsilon^{-sT_r/2} + \left(\frac{K_2}{1+K_0}\right)\epsilon^{-sT_r}$$

$K_0$, $K_1$ and $K_2$ are the values hereinbefore defined.

$P_o'$ is a reentrant line or a continuously reflecting line which does not terminate in the characteristic impedance at either end.

The system and method shown and described in FIGURES 20 and 21 can be applied to a wide variety of pneumatic, mechanical, chemical processes and electrical systems. This system method is also applicable to periodically-sampled systems and to digital computer control. The sampling period must be chosen to be one-half of $T_r$. The equation given above for $P_o'$ is the scheduling for the digital control for dead-beat response, zero positional error, and no overshoot on step inputs.

This system and method can also be applied to the dead-beat control of an integral plus a resonant pole pair. However, it requires another pulse because the system is third order. Setting the vector sum equal to zero, the arithmetic sum equal to unity, and the sum of the integrals equal to the integral of the input, yields the necessary equations to solve for the scheduling. For complete response in ⅔ period, the posicast control should be $$1+P = 3.33 - 6.32\epsilon^{-sT_r/3} + 5.66\epsilon^{-sT_r2/3} - 1.66\epsilon^{-sT_r}$$

FIGURE 22 is a schematic diagram of an electromechanical form of control which embodies the invention of FIGURES 19 and 20. As shown in FIGURE 22, I have a radar antennae 81 which it is desired to control. The antennae is coupled to a shaft 82 through gears 83 and 84. The arm 86 of a potentiometer 87 is mounted on one end of the shaft 82 and serves to measure the position of the antennae 81 by delivering a voltage which is measured between the arm and one side of the potentiometer. A battery 88 is placed across the ends of the potentiometer 87 to give a D.C. reference voltage.

The measure of the antennae position is, therefore, indicated by the voltage on lines 89 and 91. The voltage across lines 89 and 91 is normally fed into a winding 92. Winding 92 is one field of an amplidyne dynamo electric amplifier 93.

The antennae position computer is also connected across the battery 88 by conductors 97 and 98, conductor 98 being connected to conductor 91. The antennae position computer serves to give the desired position of the antennae and generates a signal which is termed the input signal or $\theta_1$. This input signal is applied across a winding 99 which is a separate field on the amplidyne 93.

It is readily apparent that the difference between the two fields 92 and 99 produces a resultant error flux in the amplidyne 93. The error flux produces a voltage in the amplidyne which is substantially proportional to the error. This voltage is applied across a winding 101 which is the field of the D.C. generator 102. The voltage causes a current to flow in the winding 101 and the error signal is therefore amplified in the D.C. generator 102. The D.C. generator is of such a size that it can deliver significant quantities of power without a substantial voltage drop. The output of the D.C. generator is applied to the D.C. motor 103 that has a winding 104 which is supplied with a constant field current. The D.C. motor drives the shaft 82 and the gears 83 and 84 to drive the inertia of the radar antennae and to tend to restore the position of the potentiometer 87 to that value which would cause the currents in the windings 92 and 99 to cancel out perfectly.

However, as is well known, a positional feedback system of this type is often unstable unless one or more antihunt networks are introduced. Antihunt networks of this type are well known to those skilled in the art and are shown by the block 106 which is connected to the output of the amplidyne 93 and which is connected to antihunt winding 107.

However, it has been found that even with antihunt networks, a system of this type can possibly exhibit slightly damped resonant oscillations. To compensate for these oscillations in a manner described in conjunction with FIGURES 20 and 21, I have provided the amplidyne with two additional windings 111 and 112. The winding 111 is connected to the output of the block $P_1$ and the input of the block $P_1$ is connected to the output of the antennae position computer 96 through a switch 113. Block 114 is connected through a switch 116 to the output of the amplidyne 93. The output of the block 114 is connected to the input of block $P_o$ and to the output of a block 117 having a transference of $$\frac{1}{G_1 G_2 F}$$

by conductors 118 and 119. A switch 120 is connected between conductors 118 and 119. A conductor 121 connects the other side of the output of block 117 to the input of block $P_o$. One input terminal of block 117 is adapted to be connected to conductor 98 by switch 122 and the other input terminal of block 117 is connected to conductor 89 by conductor 123.

When all of the switches 113, 116 and 122 are open as shown, the feedback system is of a normal type well known to those skilled in the art. However, when switch 113 is closed, a component of the input signal is delivered to the command signal generator $P_i$ which delivers a command signal upon changes in the input command $\theta_i$. As previously disclosed, the block $P_i$ has a Laplace transfer function derived from the equation in column 11. As also described previously, the block $P_i$ can cause a response in ½ period or less. In the system shown in FIGURE 22, $P_i$ can take the form of a reflecting transmission line of the type shown in FIGURE 15. The mode of operation of the transmission line would be such that a change in the input command $\theta_i$ would first deliver a large positive pulse to the winding 81 and shortly thereafter a large negative pulse to the same winding and at the end of a prescribed period the output of the transmission line for block $P_i$ would go to zero. Such a block is adequate for compensating for oscillations which may be excited by sudden changes in the input in the original feedback system.

Now let it be assumed that we wish to prevent oscillations from being excited by load disturbances such as sudden changes in wind loads on the radar antennae 81. Switches 116 and 122 are closed for this type of compensation.

Closing of switch 122 supplies the feedback signal to a linear network filter represented by the block 117 whose transfer function is equal to the reciprocal of the loop transfer function. It is apparent to one skilled in the art that this filter can be designed so that it would be in the nature of an augmented high derivative computer. However, as explained previously, it is not necessary for this filter to be able to pass low frequencies. It, therefore, need have only the characteristics given by the required transfer function and only for frequencies of the order of the resonant frequency and slightly higher which would be gain ranges between unity and plus 10 db and phase shifts of the order of 90° to 180° leading phase.

The output of this linear filter represented by the block 117 is part of the disturbance compensation signal and is presented to the pulse generating network represented by the block $P_0$. This is equivalent to the signal $m$ in FIGURE 20.

Closing switch 116 provides a signal proportional to the sum of the fluxes in all of the field windings 92, 99, 107, 111, and 112. This is proportional to signal $\theta_c$ in FIGURE 20. The attenuator 114 adjusts the level of this signal to compensate for the amplidyne gain, and the output of the attenuator is the other part of the load disturbance compensation signal. The voltage between conductors 118 and 119 in FIGURE 22 corresponds to the sum of the signals $r$ and $q$ or $r$ and $g$ in FIGURE 20.

The transfer function for the $P_0$ block is shown in column 11. The block can be constructed of various delay lines as hereinafter described. The output of this block $P_0$ can be termed the disturbance compensation command which is introduced across the winding 112 of the amplidyne dynamo-electric amplifier 93.

In the embodiment of my invention shown in FIGURE 22, I have chosen to separate the various commands in the manner shown in order that most of the signal additions and subtractions required can be performed by adding and subtracting fluxes due to the various field windings on the amplidyne. The mode of action is identical in FIGURES 20 and 22, although the arrangements for adding the various signals are different.

It is within the scope of this invention to construct the control in FIGURE 22 with the switches 113 and 116 permanently open, the blocks $P_1$ and 114 removed, switch 120 permanently closed, the block 117 having the transference $$1+\frac{1}{G_1G_2F}$$

and the block $P_0$ replaced by the block $P_0'$ as shown in FIGURE 20. In this case, the block $P_0'$ compensates for both load disturbances and input changes from the antennae position computer.

FIGURE 23 shows another embodiment of my system and method applied to a direct recording ammeter. As shown, my system consists of a recording device 131 which is comprised of a permanent magnet 132 having opposite poles 133 and 134. The movement for the device is of the conventional D'Arsonval type and consists of a coil 136 pivotally mounted between the poles 133 and 134 and provided with restraining springs 137 which also form the electrical connections to the coil. The ends of the coil 136 are brought out on conductors 138 and 139. The moving coil 136 is connected mechanically to a long pen arm 141 which moves across a recording paper (not shown) to record its position through electrical, heat, or ink type recording mechanisms. As is well known, the deflection of the pen 141 is a function of the current flowing through the conductors 138 and 139. However, the deflection of the pen is also influenced by the dynamic characteristics of the inertia of the coil and the pen mechanisms, the spring constant of the restraining spring and the effects of the magnet poles 133 and 134 on the flux field.

In order to make the pen arm 141 move from its initial to its final position in accordance with an input signal applied across input terminals 144 and 146 in a time much less than ½ cycle of the resonant period of the mechanical system, I have provided an additional control signal which is impressed across terminals 147 and 148 in series with the input signal on terminals 144 and 146. The combined signal is applied to the grid 151 of a vacuum tube 152. The vacuum tube 152 acts as a conventional amplifier and when plate current flows in conductor 153 from the plate of tube 152, current flows through the moving coil 136.

A conventional voltage supply is provided for the amplifier and is designated by the terminals B— and B+. The cathode 154 of the tube is connected to B— through a biasing resistor 156. The screen 157 is connected to the B+ terminal through a voltage dropping resistor 158. The suppressor grid 159 is connected to the cathode for a purpose well known to those skilled in the art.

The compensating signal applied across terminals 147 and 148 is derived in the following manner. The input signal across terminal 144 and 146 is impressed across the primary winding 161 of a step-up transformer 162. The secondary 163 of the transformer is provided with a tap 164 which is connected to terminal 147. The output of the secondary winding is applied to the input of a transmission line 166 through a series resistor 165. The output of the transmission line 166 is connected in series with a resistor 167 and a second transmission line 168. Transmission line 168 is terminated in a high impedance 169.

The operation of the step-up transformer 162, the transmission lines 166 and 168 and the resistor 165, 167 and 169 has been described in conjunction with FIGURE 15. The net effect of these elements in conjunction with the amplifying tube 152 is that a positive input step signal will cause a large positive command signal for a short time, a large negative signal for a short time and a steady-state final value after these two pulses. This combination of signals is sufficient to drive the mechanical structure including the pen 141 from its initial to its final value in a fraction of the resonant period and without overshoot.

In FIGURE 24 I have shown a schematic diagram of an application of my system and method illustrated in FIGURE 15. In this embodiment of my invention shown in FIGURE 24 I am controlling the deflection of an electron beam in an oscilloscope. As shown in FIGURE 24, I have provided a cathode ray tube 181 having deflection plates 182 and 183. The plates can either be horizontal or vertical deflection plates. Voltage is applied to these plates through a conductor 184 which we will assume is of sufficient length that it creates an inductance in the circuit which is significant and undesirable.

A vacuum tube 185 is provided as a final amplifier and has a plate 186, a cathode 187 and control, screen and suppressor grids 188, 189 and 191 respectively. The plate 186 is connected to a peaking inductance 192 and a load resistance 193 of conventional design. A conventional power supply is provided and is designated by the terminals B— and B+. The plate is connected to the B+ terminal through resistance 193. The screen grid 189 is connected to the B+ terminal by conductor 194 and the cathode 187 is connected to the B— terminal through a biasing resistor 196. The suppressor grid 191 is connected to the cathode by conductor 197.

The input signal is applied across terminals 198 and 199 in series with an additional control signal applied across terminals 201 and 202 to the control grid 188.

The input signal across terminal 198 and 199 is impressed across the network which is of the same type as that disclosed in FIGURE 23 and for that reason will not be described in detail.

The operation of this system is very similar to that of FIGURE 23. A step input change of voltage will cause two pulses, one of positive polarity and the other of negative polarity to appear across terminals 201 and 202 and the sum of these effects will be impressed upon the grid 188 of the tube 185. The pulses impressed on the grid will cause the voltage applied to the plate 186 to vary in the same manner to cause a sequence of pulses ranging in magnitude and timing so that the voltage across the deflection plates 182 and 183 will change from its initial to its final value in a small portion of the resonant period of the LC combination of the lead 184 and the capacitance of the plates 182 and 183.

In FIGURE 25 I have shown a schematic diagram of a hydraulic pitch control apparatus for an airplane which incorporates my system and method. The pitch control consists of a control stick 206 connected to the slide 207 of a conventional valve 208. A pump 209 and an oil reservoir 211 are connected to the valve 208 by conventional piping.

In a conventional pitch control system, the pressure differential in hydraulic lines 212 and 213 would be applied directly to lines 214 and 216 which are connected to a hydraulic actuator 217 consisting of a cylinder 218, a piston 219 and a centering spring 220. The piston 219 is connected to an elevator 221 of the airplane. The elevator is pivoted about the point 222 responsive to the changes in position of the piston 219.

However, in addition to the conventional control, I have added additional piping in series with lines 214 and 216. This additional piping includes orifices 224 and 226. One portion of the additional piping is connected to a hydraulic reflecting transmission line 227 hereinafter described in detail.

When a sudden change of pressure occurs in line 212, one-half of the pressure is applied to the input to the line 216 and to the input of the hydraulic transmission line 227. The pressure pulse is propagated down the hydraulic transmission line 227 and is reflected at the closed end of the hydraulic transmission line with a doubling in pressure and the pressure pulses actually arrive at the input to the transmission line as the full pressure which originally had appeared in the line 212. The full pressure is impressed across the input to the line 216 and is carried by the line 216 to the piston 219.

The orifice 226 has been provided as a bleed orifice between the lines 212 and 213 so that a steady-state position of the control stick 206 will create a steady-state pressure differential between lines 212 and 213. This steady-state pressure differential has been impressed across the two sides of the piston 219 and is balanced by the force of the centering spring 220 which controls the correspondence between the pressure differential between the lines 212 and 213 and the final steady state position of the elevator 221.

The action of the pitch control apparatus is such that a sudden change in the position of the control stick 206 causes a force to be applied to the elevator 221 tending to change it suddenly to a position corresponding to half of the final steady-state position and after a time given by the time of transmission and reflection of the hydraulic transmission line 227, the elevator 221 is moved to its final steady-state value.

The timing of the two actions or pressure pulses is determined by the resonant frequency of the pitch axis of the aircraft as a whole. The apparatus shown in FIGURE 25 is a half period control which is of the elementary type disclosed by the block diagrams in FIGURE 10. However, it is within the scope of this invention to provide a doubly reflecting hydraulic transmission line to obtain a double pulse or faster than half cycle control such as the type disclosed in FIGURES 13 and 15.

In FIGURE 26 I have shown a detailed schematic view of a hydraulic transmission of the type utilized in conjunction with the hydraulic pitch control apparatus disclosed in FIGURE 25. As shown, the hydraulic transmission line consists of a plurality of pistons 231 in a cylinder 232 with a plurality of interconnecting springs 233. The series is provided with an inlet port 234 and an exhaust port 235. Each of the inter-piston spaces is filled with fluid and is provided with a vent 236.

Now let it be assumed that the inlet 234 and the volume 237 adjacent to the first piston 231 is filled with fluid and that a positive pressure pulse is introduced into the port 234. The increased pressure of the fluid will cause this piston to move to the right against the pressure of the spring 233 and cause the exhausting of a small amount of fluid through the vent 236. The inertia of the fluid in the space before the first piston and the inertia of the piston combined with the spring constant of the backing spring 233 and the effective spring constant of any deflection in the walls of the cylinder will produce a highly efficient resonant circuit of very high frequency. This forms one element of the delay line. The force from the first spring is transmitted to the second piston and so forth.

The same action takes place at each of the pistons and thus a sudden pressure pulse will be transmitted sequentially through the springs and pistons until it appears at the exhaust port 235. The port 235 is shown open which is equivalent to a short circuited transmission line where pressure corresponds to voltage and velocity corresponds to current.

If the port 235 had been closed, the hydraulic transmission line would be equivalent to an open circuited transmission line. If the port 235 were assumed to exhaust through a restricted orifice, then the design of the orifice could be used to control the apparent terminating impedance of the hydraulic transmission line and to thus control the magnitude and type of the reflected pressure pulse in the line.

In FIGURE 27 I have shown a type of valve which can be introduced in each vent 236 of the hydraulic line in FIGURE 26. The purpose of this series of valves is to vary the effective length of the hydraulic delay line. As shown, the spaces between the pistons and the fluid reservoir have been provided with lines 241 and 242 connected by a control valve 243. The control valve is provided with a ball 244 which is adapted to seat in a tapered seat 246 to close the passage between lines 241 and 242. Electromagnets 247 and 248 are provided at opposite sides of the ball valve and thus when electromagnet 248 is energized, the ball 244 is pulled into the seat 246 to prevent the flow of fluid and to stop the spring motion. When electro-magnet 248 is de-energized and 247 is energized, the ball is pulled away from the seat and permits a flow of fluid and spring motion.

If a valve of this type were provided for each vent of the hydraulic delay line shown in FIGURE 26, and by appropriately energizing the proper electro-magnets, it would be possible to change the length of the hydraulic transmission line. Thus, if a hydraulic transmission line of this type were utilized in the hydraulic pitch control apparatus disclosed in FIGURE 25, it would be possible to adjust the apparatus to operate properly for a variety of different resonant frequencies of the aircraft in the pitch axis corresponding to different attitudes of flight. For example, as the airplane changes from climb to dive and the velocity varies widely, the pitch axis resonant frequency also changes. Thus, with the control of the type herein disclosed, pulses may be introduced to the elevators 221 with proper timing regardless of the pitch axis resonant frequency.

It is apparent from the foregoing that I have provided a control system and method particularly adapted for use with lightly damped resonant systems even though the systems are subject to load disturbances as well as disturbances in the input. It is also apparent from the foregoing that my control system and method has application to all types of systems whether pneumatic, mechanical, or electrical.

I claim:

1. In a damped resonant feedback system for controlling an output variable in accordance with an input signal, said output variable being subject to disturbances, the system comprising means for generating from said input signal a sequence of control command signals having wave shapes substantially similar to the wave shapes of the input signal, means for measuring the output variable, means for generating a disturbance compensation signal determined from the measured output variable, means for generating a sequence of disturbance compensation command signals from said disturbance compensation signals with wave shapes substantially similar to the wave shape of the disturbance compensation signal, and means for adding said control and disturbance compensation command signals and feeding the same into said resonant feedback system.

2. The system as in claim 1 wherein said output variable is a function of the position of an inertia possessing body.

3. A system as in claim 1 wherein said means for adding the control and disturbance compensation command signals comprises fields of a dynamo-electric amplifier.

4. A system as in claim 1 wherein said means for measuring the output variable comprises an electro-mechanical transducer.

5. A system as in claim 1 wherein said means for generating a disturbance compensation signal comprises a network having a transference equal to the reciprocal of the open loop transference.

6. In a method for controlling the output variable in a damped resonant feedback system in accordance with an input signal, the output variable being subject to disturbances, the method comprising the steps of generating from said input signal a sequence of control command signals having wave shapes substantially similar to the wave shape of the input signal, measuring the output variable, generating a disturbance compensation signal with information received from the output variable, generating a sequence of disturbance compensation command signals from said disturbance compensation signal with wave shapes substantially similar to the wave shape of the disturbance compensation signal, adding said control and disturbance compensation command signals and feeding the same into said resonant feedback system.

7. In a damped resonant feedback system for controlling an output variable in accordance with an input signal, said output variable being subject to disturbances, the system comprising means for measuring the output variable, means for generating a disturbance compensation signal determined from the output variable, means for generating a sequence of disturbance compensation command signals from said disturbance compensation signal with wave shapes substantially similar to the wave shape of the disturbance compensation signal, and means for adding said input and said sequence of disturbance compensation command signals and feeding the same into said resonant feedback system.

8. A system as in claim 7 wherein said means for generating a disturbance compensation signal comprises a network having a transference of one plus the reciprocal of the loop gain of the open loop.

9. In a method for controlling the output variable in a damped resonant feedback system in accordance with an input signal, the output variable being subject to disturbances, the method comprising the steps of measuring the output variable, generating a disturbance compensation signal with information received from the output variable, generating a sequence of disturbance compensation command signals from said disturbance compensation signal with wave shapes substantially similar to the wave shape of the disturbance compensation signal, and adding said input and said sequence of disturbance compensation commands and feeding the same into said resonant feedback system.

10. In a damped resonant feedback system for controlling an output variable in accordance with an input signal, said output variable being subject to disturbances, the system comprising means for measuring an output variable, means for generating a disturbance compensation signal determined from the output variable, means for generating a sequence of disturbance compensation command signals from said disturbance compensation signal with wave shapes substantially similar to the wave shape of the disturbance compensation signal, and means for feeding said sequence of disturbance compensation command signals into said resonant feedback system.

11. In a method for controlling the output variable in a damped resonant feedback system in accordance with an input signal, the output variable being subject to disturbances, the method comprising the steps of measuring the output variable, generating a disturbance compensation signal from information received from the output variable, generating a sequence of disturbance compensation command signals from said disturbance compensation signals with wave shapes substantially similar to the wave shape of the disturbance compensation signal, and feeding said disturbance compensation command signals into said resonant feedback system.

12. A system as in claim 1 wherein said means for generating a disturbance compensation signal comprises a network containing a transference signal equal to the reciprocal of the closed loop transference.

13. In a method for controlling the output variable in a damped resonant system in accordance with an input signal, the steps of generating from said input signal a sequence of control command signals having wave shapes substantially similar to the wave shape of the input signal, and adding said input and control command signals and feeding the sum into said resonant system to produce a system step response with minimized oscillations.

14. A system as in claim 2 wherein said means for measuring the output variable comprises an electro-mechanical transducer and wherein said means for adding the sequence of control command signals and disturbances compensation command signals comprises fields of a dynamo-electric amplifier, together with means for applying torque to the said inertia responsive to the output of the said dynamo-electric amplifier.

15. In a damped resonant system for controlling the position of a structure in accordance with the position of a control element, the system comprising a hydraulic transmission line, a hydraulic transducer, means for connecting the hydraulic transducer to the structure whereby upon flow of fluid to the structure, the position of said structure is changed, a source of hydraulic fluid under pressure connected to the hydraulic transducer, the hydraulic transducer being connected to the control element whereby upon change of position of the control element fluid pressure is applied to the transmission line and to the structure so that first a directly transmitted flow of fluid is applied to said structure and then a reflected flow of fluid from the said transmission line is applied to said structure.

16. In a damped resonant system for controlling an output variable in accordance with an input pulse, the system comprising a pneumatic transmission line, an element for controlling the output variable, a differential pressure measuring device connected to the element, an orifice, a source of pressure connected to said pneumatic transmission line through said orifice and to one side of said pressure measuring device, said transmission line also being connected to the other side of the pressure measuring device whereby when a pulse of pressure is applied to said transmission line, a transmitted pulse and then a reflected pulse are sequentially applied to the pressure measuring device.

17. In a damped resonant system for controlling an output variable in accordance with an input signal, the system comprising an electro-mechanical transducer, means for generating from said input signal a sequence of control command signals having wave shapes substantially similar to the wave shapes of the input signal, said means consisting of a lumped parameter, transmission-line analog, and means feeding said sequence of control command signals into said resonant system.

18. A system as in claim 17 wherein said electro-mechanical transducer comprises a recording instrument.

19. In a damped resonant system for controlling an output variable in accordance with an input signal, the system comprising a capacity and an inductance, means for generating from said input signal a sequence of control command signals having wave shapes substantially similar to the wave shapes of the input signal, said means consisting of a transmission line, and means feeding said sequence of control command signals into said resonant system.

20. A system as in claim 19 wherein said capacity is the capacity of the deflection electrode of a cathode ray tube and wherein said inductance is the inductance of the associated circuitry and wiring.

21. In a damped resonant system for controlling an output variable in accordance with an input signal, the system comprising means for generating from said input signal a sequence of control command signals having wave shapes substantially similar to the wave shapes of the input signal and having specified time relationships, and means for feeding said sequence of control command signals into said resonant system, said specified time relationships being chosen to produce a deadbeat response of the said output variable for a predetermined input signal wave shape.

22. In a damped resonant system for controlling an output variable in accordance with an input signal, the system comprising means for generating from said input signal a sequence of control command signals having wave shapes substantially similar to the wave shapes of the input signal and having specified time relationships, and means for feeding said sequence of control command signals into said resonant system, said specified time relationships being chosen to produce a deadbeat response of the said output variable for a predetermined input signal wave shape, the total elapsed time between the first and the last control command signals in the said sequence for a predetermined input signal wave shape being a substantial portion of the resonant period of the response of said system to a single control command signal of step waveform.

23. In a damped resonant system for controlling an output variable in accordance with an input signal, the system comprising means for generating from said input signal a sequence of control command signals having wave shapes substantially similar to the wave shapes of the input signal and having specified time relationships, and means for feeding said sequence of control command signals into said resonant system, said specified time relationships being chosen to produce a deadbeat response of the said output variable for a predetermined input signal wave shape, the sequence consisting of only three control command signals of alternating polarity and substantially equal amplitudes.

24. In a damped resonant system for controlling an output variable in accordance with an input signal, the system comprising means for generating from said input signal two control command signals of the same polarity having wave shapes substantially similar to the wave shape of the input signal and having a specified time relationship, the second following the first after a single time interval equal to one-half period of the resonant response of the said system to a single control command signal of step wave form, and means for feeding said two control command signals into said resonant system to produce a deadbeat response of the output variable for a predetermined input signal wave shape.

25. In a method for controlling the output variable of a damped resonant system in accordance with an input signal, the steps of generating from said input signal a sequence of control command signals having wave shapes substantially similar to the wave shape of the input signal and having specified time relationships, and feeding said sequence of control command signals into said resonant system, said specified time relationships being chosen to produce a deadbeat response of said output variable for a predetermined input signal wave shape.

26. In a method for controlling the output variable in a damped resonant system in accordance with an input signal, the steps of generating from said input signal two control command signals of the same polarity having wave shapes substantially similar to the wave shape of the input signal and having a specified time relationship, the second following the first after a single time interval equal to one-half period of the resonant response of the said system to a single control command signal of step wave form, and feeding said two control command signals into said resonant system to produce a deadbeat response of said output variable for a predetermined input signal wave shape.

27. In a feedback system for controlling an output variable in accordance with an input signal, the system comprising means for measuring said output variable, means for generating a compensation signal from said measured output variable, means for generating from said compensation signal a sequence of control command signals having wave shapes substantially similar to the wave shape of the said compensation signal, and means for feeding said sequence of control command signals into said feedback system, such that in the absence of said sequence, the response of the output variable of said feedback system would be a damped oscillation, and such that with the said sequence, the response of the output variable would be deadbeat for a predetermined input signal wave shape.

28. In a feedback system for controlling an output variable in accordance with an input signal, the system comprising means for measuring said output variable, means for generating a compensation signal from said measured output variable, means for generating from said compensation signal a sequence of control command signals having sepecified time relationships, said control command signals having adjustable amplitudes and polarities, and having wave shapes substantially similar to the wave shape of the said compensation signal, and means for feeding said sequence of control command signals into said feedback system, said amplitudes, polarities and time relationships of said sequence chosen to produce a deadbeat response of the said output variable for a predetermined input signal wave shape.

29. In a feedback system for controlling an output variable in accordance with an input signal, the system comprising means for measuring said output variable, means for generating a compensation signal from said measured output variable, means for generating from said compensation signal a sequence of control command signals having wave shapes substantially similar to the wave shape of the said compensation signal, means for combining the input signal, the measured output variable, and the sequence of control command signals, and means for feeding the said combination into said feedback system to produce a deadbeat response of the said output variable for a predetermined input wave shape.

30. In a method for controlling the output variable in a feedback system in accordance with an input signal, the steps of measuring the output variable, generating a compensation signal from said measured output variable, generating from said compensation signal a sequence of control command signals having wave shapes substantially similar to the wave shape of said compensation signal, combining the input signal, the measured output variable and the sequence of control command signals, and feeding the combined signals into the feedback system to produce a deadbeat response of the output variable for a predetermined input wave shape.

References Cited in the file of this patent

UNITED STATES PATENTS

| | | |
|---|---|---|
| 2,351,079 | Stroble | June 13, 1944 |
| 2,351,353 | McCarty | June 13, 1944 |
| 2,446,567 | White et al. | Aug. 10, 1948 |
| 2,537,090 | Riebman | Jan. 9, 1951 |
| 2,692,358 | Wild | Oct. 19, 1954 |
| 2,729,793 | Anderson | Jan. 3, 1956 |
| 2,732,520 | Couaunault | Jan. 24, 1956 |

OTHER REFERENCES

Lauer, Lesnick & Matson: Servomechanism Fundamentals, First Edition, pp. 85–87, McGraw-Hill, New York, 1947.

Ahrendt, W. R.: Servomechanism Practice, First Edition, p. 317, FIG. A-4, McGraw-Hill, New York, 1954.

Terman, F. E.: Fundamentals of Radio, First Edition, McGraw-Hill, 1938, p. 305, FIG. 175.

Terman, F. E.: Electronic and Radio Engineering, McGraw-Hill, New York, 1955, pp. 634, 636.